United States Patent

Cosden

[11] Patent Number: 5,346,113
[45] Date of Patent: Sep. 13, 1994

[54] ROTATABLE STAPLER ASSEMBLY

[75] Inventor: Marvin P. Cosden, Dover, Del.

[73] Assignee: Delmarva Sash & Door Co. of Maryland, Inc., Barclay, Md.

[21] Appl. No.: 1,501

[22] Filed: Jan. 6, 1993

Related U.S. Application Data

[62] Division of Ser. No. 730,223, Jul. 15, 1991, Pat. No. 5,191,706.

[51] Int. Cl.⁵ .............................................. B27F 7/17
[52] U.S. Cl. ................................... 227/110; 227/154
[58] Field of Search ....................... 227/78, 110, 154; 248/639, 652, 653, 654, 664; 29/798

[56] References Cited

U.S. PATENT DOCUMENTS

| | | | |
|---|---|---|---|
| 2,830,296 | 4/1958 | Guerrant | 227/150 |
| 2,903,699 | 9/1959 | Mazzola | 227/148 |
| 2,936,457 | 5/1960 | Chafin | 227/40 |
| 3,015,348 | 1/1962 | Zern | 144/2 R |
| 3,112,105 | 11/1963 | Keller | 269/236 |
| 3,252,642 | 5/1966 | Page | 227/100 |
| 3,261,527 | 7/1966 | Sterner | 227/7 |
| 3,278,177 | 10/1966 | Zern | 269/41 |
| 3,431,619 | 3/1969 | Bowers, Jr. | 29/822 |
| 3,502,256 | 3/1970 | Boulay et al. | 227/7 |
| 3,559,863 | 2/1971 | Sack | 227/152 |
| 3,628,714 | 12/1971 | Offenwanger | 227/7 |
| 3,672,554 | 6/1972 | Smith | 227/93 |
| 3,681,842 | 8/1972 | Blakeslee | 29/430 |
| 3,707,256 | 12/1972 | Lubin | 227/7 |
| 3,733,020 | 5/1973 | Ingram | 227/5 |
| 3,822,815 | 7/1974 | Davis | 227/7 |
| 3,873,015 | 3/1975 | Whitaker | 227/7 |
| 3,894,670 | 7/1975 | Giebel | 227/110 X |
| 4,039,112 | 8/1977 | Schultz | 227/40 |
| 4,126,259 | 11/1978 | Galer et al. | 227/30 |
| 4,127,226 | 11/1978 | Jasper | 227/69 |
| 4,175,313 | 11/1979 | Neumann | 29/432 X |
| 4,254,895 | 3/1981 | Cheak | 227/50 |
| 4,258,873 | 3/1981 | Vela | 227/4 |
| 4,305,538 | 12/1981 | Schultz et al. | 227/2 |
| 4,330,921 | 5/1982 | White, Jr. | 29/432 |
| 4,392,599 | 7/1983 | Russell | 227/40 |
| 4,436,234 | 3/1984 | Kennedy | 227/4 |
| 4,479,600 | 10/1984 | Albright | 29/798 |
| 4,708,276 | 11/1987 | Knoth et al. | 227/7 |
| 5,095,605 | 3/1992 | Tonus | 269/37 |

*Primary Examiner*—Mark Rosenbaum
*Assistant Examiner*—S. Thomas Hughes
*Attorney, Agent, or Firm*—Roylance, Abrams, Berdo & Goodman

[57] ABSTRACT

A rotatable stapler assembly for attachment to a machine for conducting a manufacturing step is provided. The stapler assembly includes a support bar, a stapler and an air cylinder assembly. The support bar has top and bottom arms and a middle portion which extends between the top and bottom arms. The bottom arm is designed to be rotatably attached to a machine such that the stapler assembly rotates about a longitudinal axis of the bottom arm. The stapler is attached to the middle portion. The air cylinder assembly is designed to extend between the machine and the top arm. In this manner, when the air cylinder assembly is activated, it rotates the support bar to place the stapler in the desired position relative to a work piece. When the stapler is in the proper position, it is activated to drive a staple into the work piece. When the air cylinder assembly is deactivated, the stapler returns to the start position.

15 Claims, 23 Drawing Sheets

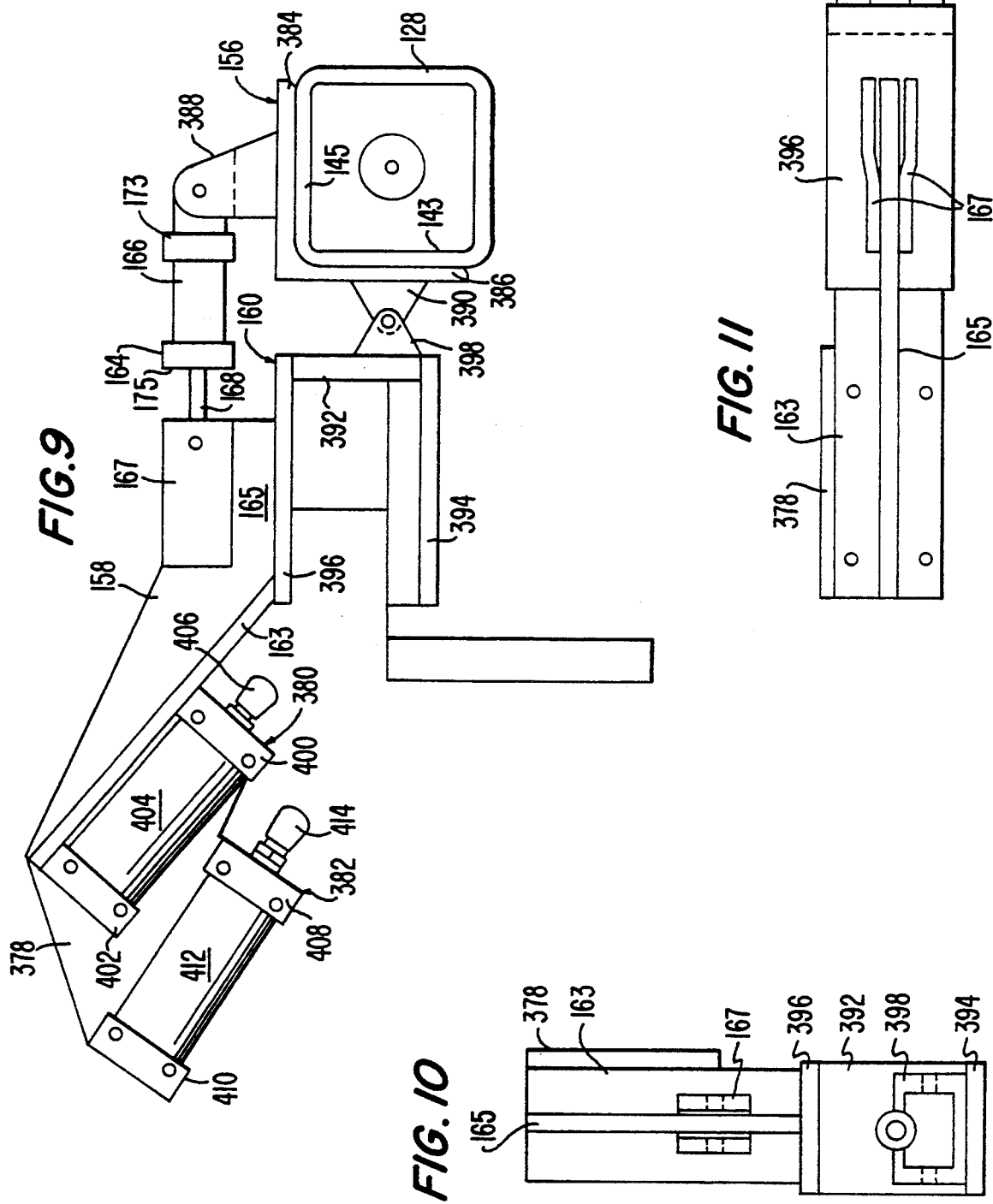

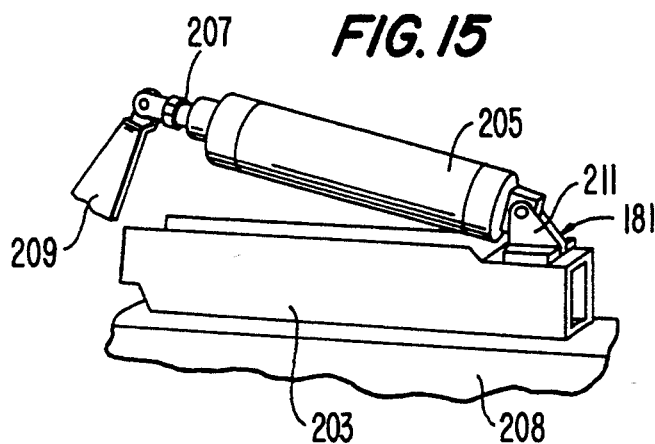
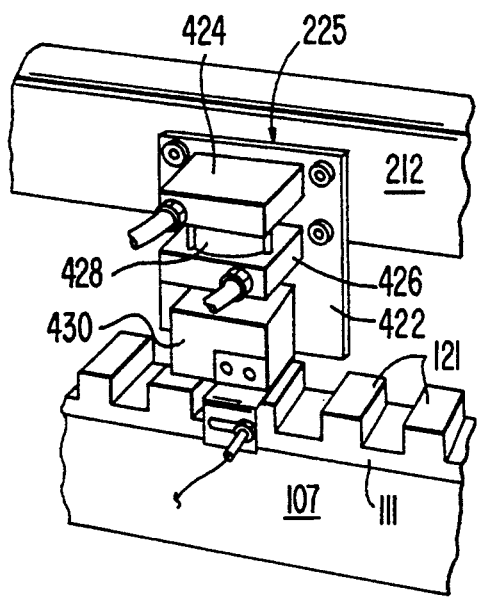
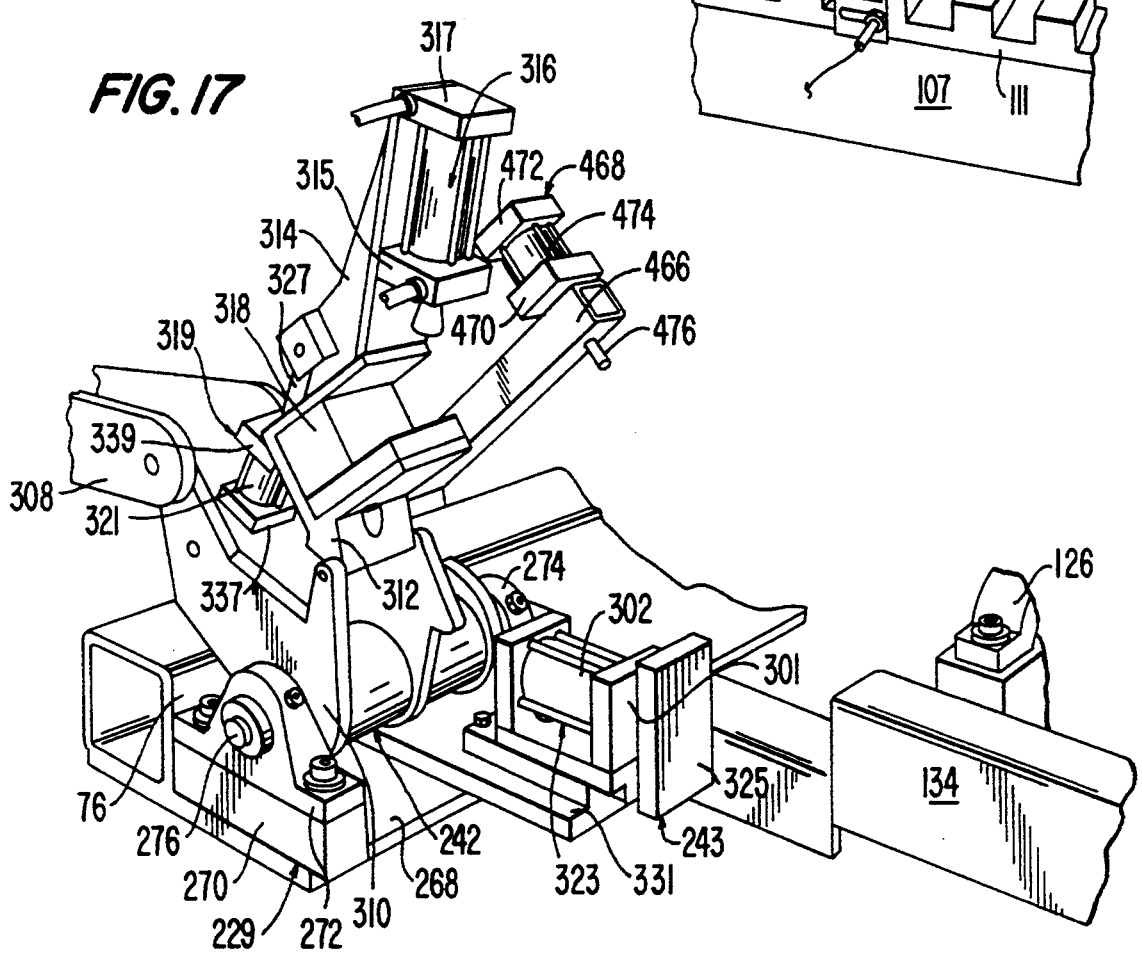

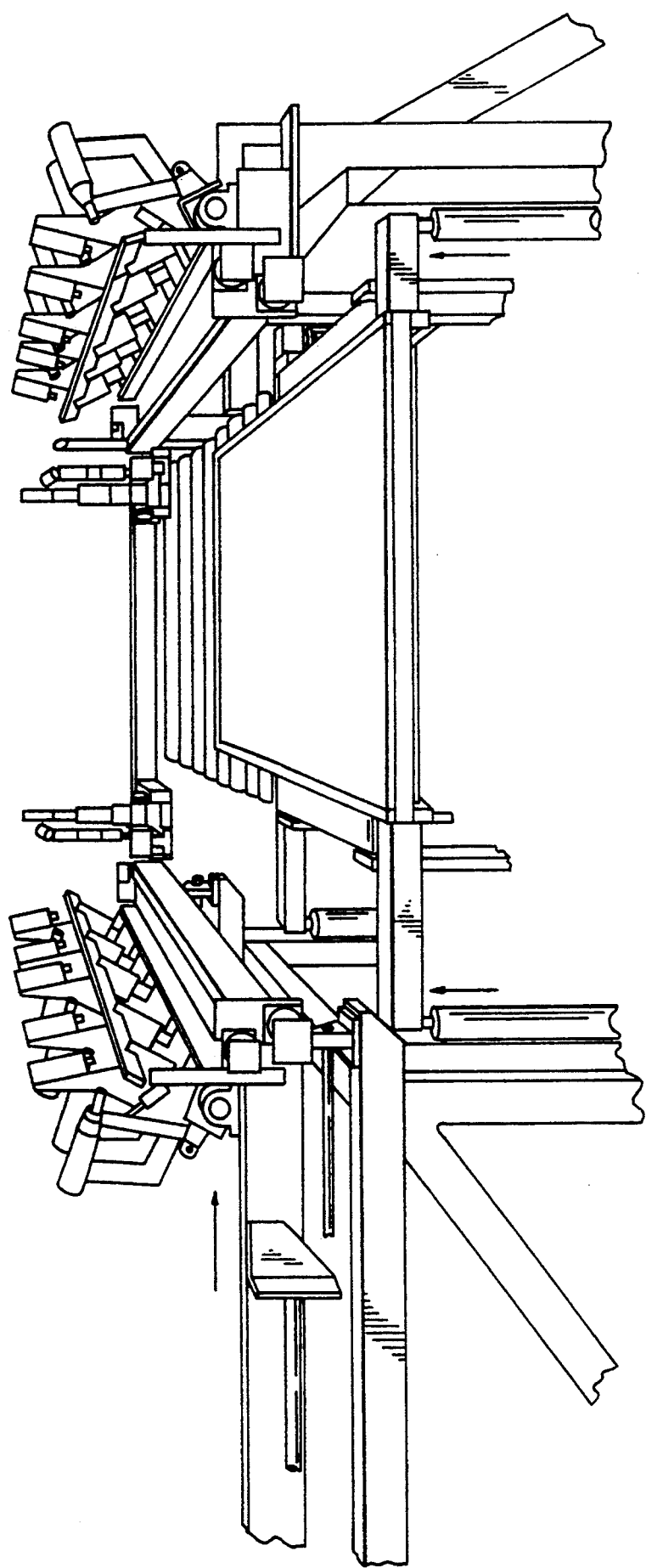

ROTATABLE STAPLER ASSEMBLY

This is a division of application Ser. No. 07/730,223 filed Jul. 15, 1991, now U.S. Pat. No. 5,191,706.

FIELD OF THE INVENTION

This invention relates to machines for and methods of semi-automatically attaching casing or molding to a structural frame assembly, such as a pre-hung door assembly. More particularly, this invention relates to machines for and methods of attaching casing to a structural frame assembly wherein the structural assembly is received and retained by a machine, the casing properly positioned on the structural frame assembly by the machine and fasteners such as staples driven through the casing by the machine into the structural frame assembly to securely attach the casing to the frame assembly.

BACKGROUND OF THE INVENTION

Prior to the development of pre-hung door assemblies, door assemblies in home and commercial construction and reconstruction were constructed at the job site, in the respective doorways. That is, the individual elements comprising the assembly were received at the job site and the door assembly was completely constructed at the job site.

Thereafter, beginning in the late 1950's and early 1960's, the use of pre-hung door assemblies became prevalent. Pre-hung door assemblies are doors and jambs which are assembled in the factory (i.e. the jambs are attached and the door is attached to the assembled jambs) and shipped to retail outlets through distribution channels as complete units or assemblies. Such pre-hung doors assemblies are then installed in the framing forming the doorways. The casing or molding is attached to the jambs on the job site after the pre-hung door assemblies are affixed to the framing.

The development of such pre-hung door assemblies was an advance in building construction technology and provided many benefits over the prior method of constructing door assemblies entirely at the job site. Among these benefits are that, due to the fact that the pre-hung door assemblies are constructed at a manufacturing site by persons who become skilled at the task, the pre-hung door units are generally of higher quality and are consistently of the same dimensions. In addition, the use of such pre-hung door assemblies decreases the labor time on the job site. Moreover, such pre-hung door assemblies can be installed by almost all workers, as the installation does not require a person of great skill and experience.

However, even when employing these pre-hung door assemblies, the casing must still be properly positioned on and attached to the respective door jambs after the pre-hung door assemblies are installed at the job site. This task requires skilled labor and is time consuming. Thus, while the use of pre-hung door assemblies including the Jambs and the doors solve some problems in the field, problems remain in attaching the casing once the pre-hung door assemblies are installed.

One solution to this problem is to manually attach the casing in the factory. However, this is a time consuming process in the factory and increases the cost of the pre-hung door assemblies since the factory normally employs workers of a higher skill and compensation level than in the field. Furthermore, consistency is still a problem since the quality of the attachment is dependant on the skill level and performance of the person performing the task. Further, there is some risk of injury during this manual attachment.

Thus, there is a need for a machine and a method for semi-automatically attaching casing to pre-hung door assemblies. Such a machine and method may have applications beyond pre-hung door assemblies, and may be employed to attach molding or casing to other structural frame elements.

There is one known prior patent which discloses a machine for automatically nailing trim on door jambs, see U.S. Pat. No. 2,830,294 issued to Guerrant on Apr. 15, 1958. However, the machine disclosed in this patent is cumbersome and inefficient.

There are other patents which disclose machines and methods for assembling pre-hung doors with casing, see U.S. Pat. Nos. 3,015,348 issued to Zern on Jan. 2, 1962, 3,252,642 issued to Page on May 24, 1966 and 3,707,256 issued to Lubin on Dec. 26, 1972. The machines disclosed in these patents are also unduly cumbersome and inefficient.

Other known patents disclose machines and methods for automatically or semi-automatically assembling structural frame units, see U.S. Pat. Nos. 2,903,699 issued to Mazzola on Sep. 15, 1959, 2,936,457 issued to Chafin et al. on May 17, 1960, 3,261,527 issued to Sterner on Jul. 19, 1966, 3,278,177 issued to Zern on Oct. 11, 1966, 3,431,619 issued to Bowers, Jr. on Mar. 11, 1969, 3,628,714 issued to Offenwanger on Dec. 21, 1971, 3,672,554 issued to Smith on Jun. 27, 1972, 3,681,842 issued to Blakeslee on Aug. 8, 1972, 3,733,020 issued to Ingram on May 15, 1973, 3,822,815 issued to Davis on Jul. 9, 1974, 3,873,015 issued to Whitaker on Mar. 25, 1975, 4,039,112 issued to Schultz on Aug. 2, 1977, 4,126,259 issued to Galer et al on Nov. 21, 1978, 4,127,226 issued to Jasper on Nov. 28, 1978, 4,254,895 issued to Cheak on Mar. 10, 1981, 4,258,873 issued to Vela on Mar. 31, 1981, 4,305,538 issued to Schultz et al. on Dec. 15, 1981, 4,330,921 issued to White, Jr. on May 25, 1982, 4,392,599 issued to Russell on Jul. 12, 1983 and 4,436,234 issued to Kennedy on Mar. 13, 1984. In addition, U.S. Pat. Nos. 3,112,105 issued to Keller on Nov. 26, 1963 and 3,559,863 issued to Sack on Feb. 2, 1971 disclose devices for assembling furniture and 3,502,256 issued to Boulay et al. on Mar. 24, 1970 discloses an apparatus for closing and stapling cartons.

None of these prior machines or methods provide a machine or method for consistently, quickly and accurately positioning casing in a proper position relative a door jamb assembly or pre-hung door assembly and automatically fastening the casing to the door jamb assembly or pre-hung door assembly. Furthermore, use of the prior machines or methods does not result in a high quality work product.

Thus, there still exists a need in the technology for a machine and method for attaching casing to a pre-hung door assembly, or other structural frame assembly, which is quick, efficient, accurate and results in a high quality work piece. The machines and methods of this invention fulfill this need, as discussed below.

SUMMARY OF THE INVENTION

This invention provides a machine for attaching casing to a structural frame assembly, the machine including a support frame assembly, a fixed bank of stapling units, a movable bank of stapling units, a head bank of stapling units and mechanisms for controlling, activating and coordinating the various subassemblies of the machine.

The fixed bank of stapling units is supported by the support frame assembly and includes a first pivot bar, stapling units, clamping mechanisms and a first jamb locator. The first pivot bar is rotatably supported by the support frame assembly. The stapling units are attached to the first pivot bar, and when properly operated, drive staples to attach the casing to the structural frame assembly. The clamping mechanisms are also attached to the pivot bar and are designed to receive casing and position and clamp the casing adjacent the structural frame assembly during the stapling of the casing to the structural frame assembly. The jamb locator is fixedly supported by the support frame assembly.

The movable bank of stapling units is spaced from and oriented substantially parallel to the fixed bank of stapling units and includes support bars slidably supported by the support frame assembly, a second pivot bar, a second jamb locator, stapling units, clamping mechanisms and a mechanism for sliding the support bars relative the support frame assembly. The second pivot bar is rotatably supported by the support bars. The second jamb locator is fixedly supported by the support bars. The stapling units and clamping mechanisms are attached to the second pivot bar and function to drive staples to attach the casing to the structural frame assembly and to position and clamp the casing adjacent the structural frame assembly during the stapling of the casing to the structural frame assembly.

The head bank of stapling units is located at one end of the fixed and movable banks of stapling units and includes a third pivot bar rotatably supported by the support frame assembly and a stapling unit and clamping mechanisms attached to the third pivot bar. The stapling unit and clamping mechanisms function in the same manner as the stapling units and clamping mechanisms of the fixed and movable banks of stapling units.

The jamb locators are designed to receive and engage the structural frame assembly between them when the structural frame assembly is in the position to have the casing attached thereto.

In some embodiments of this invention, the machine includes corner splicing assemblies which are located at the corners formed by (1) the fixed bank and the head bank of stapling units and (2) the movable bank and the head bank of stapling units. These assemblies drive splines into the corners formed by the individual casing pieces when the casing is properly positioned relative the structural frame assembly.

In other embodiments, the machine includes mechanisms for transporting the structural frame assembly from a position outside of the machine to a position adjacent the fixed bank and for moving the structural frame assembly away from the fixed bank.

Other embodiments of this invention include mechanisms for rotating the pivot bars such that the clamping mechanisms and stapling units have up and down positions. The clamping mechanisms may be designed to receive casing when in the up position and to position the casing against the structural frame assembly when in the down position. The anvils of the stapling units are spaced the farthest from the casing when the stapling units are in the up position, and moved closer to the casing when the stapling units are in the down position.

In yet other embodiments, each of the clamping mechanisms and stapling units may include mechanisms for rotating the clamping mechanisms and stapling units relative the pivot bars. These mechanisms may function to apply additional clamping pressure on the casing and structural frame assembly and to position the anvils of the stapling units in contact with the casing.

This invention also includes a method of attaching casing to a structural frame assembly utilizing the machine described above and including the following steps.

The clamping mechanisms and stapling units are positioned in their up positions and the movable bank is positioned in its out position. Casing is placed in the clamping mechanisms.

The structural frame assembly is conveyed to a position such that the structural frame assembly is at the same elevation as the jamb locators and a longitudinal side of the structural frame assembly is adjacent the jamb locator of the fixed bank of stapling units. The movable bank of stapling units is then slid relative the support frame assembly until the jamb locators of the fixed and movable banks are in abutment with the longitudinal sides of the structural frame assembly. The pivot bars of the fixed bank, movable bank and head bank of stapling units are rotated and the rotating mechanisms of the clamping assemblies and stapling units are operated until the casing is clamped in abutment with the structural frame assembly and the anvils of the stapling units are in contact with the casing.

The stapling units are activated to drive staples through the casing and into the structural frame assembly. The corner splicing assemblies are activated to drive splines into the corners of the casing. The rotating mechanisms of the stapling units and clamping assemblies are operated to lift the stapling units away from the casing and such that the clamping assemblies disengage the casing. The pivot bars of the fixed bank, movable bank and head bank of stapling units are rotated to move the clamping mechanisms and the stapling units further away from the casing. Finally, the movable bank of stapling units is moved away from the structural frame assembly and the structural frame assembly is removed from the machine.

In some embodiments of this invention, the fixed bank and movable bank of stapling units each include end positioning units which are located at the ends of the fixed and movable banks of stapling units opposite the head bank of stapling units. The positioning units engage the casing and the structural frame assembly when the casing is placed in abutment with the structural frame assembly to properly align the casing longitudinally relative the structural frame assembly. The end positioning units may include top and bottom extendable and retractable arms, with the arms being oriented parallel to the jamb locators of the fixed and movable bank of stapling units. The top arms may be positioned to engage the casing and the bottom arms may be positioned to engage the structural frame assembly when the casing is in abutment with the structural frame assembly.

The fixed, movable and head banks of stapling units of other embodiments of this invention may include a plurality of spaced clamping mechanisms and stapling units.

In further embodiments of this invention, the stapling unit of the head bank of stapling units is slidably supported by the third pivot bar. The mechanism for controlling the head stapling unit may operate to move the head stapling unit along the third pivot bar and to stop and activate the head stapling unit at fixed intervals along the third pivot bar, thus driving staples into the casing at the fixed intervals.

In yet other embodiments of this invention, the mechanism for moving and positioning the structural frame assembly includes a mechanism for lifting and lowering the structural frame assembly within the support frame assembly.

In other embodiments of this invention, the stapling units of the movable bank and the stapling units of the fixed bank are aligned in parallel straight lines.

The machines and methods of this invention have many advantages over the prior machines for and methods of constructing structural frame elements having casing or attaching casing to a pre-constructed structural frame assembly.

These advantages include that employment of a machine and/or a method in accordance with this invention results in an end product, i.e., casing attached to a structural frame assembly, of a higher quality than can be achieved with prior methods and machines.

In addition, the machines and methods according to this invention provide a quicker method for attaching casing to a structural frame assembly than prior machines and methods.

Further, use of a machine and/or a method in accordance with this invention results in a more accurate assembly of the casing to the structural frame assembly. For example, the corners of the casing are in correct alignment and firmly attached, the desired reveal is provided for, etc.

Furthermore, employment of methods and machines in accordance with this invention results in a more consistent end product.

Yet another advantage is that use of machines and methods in accordance with this invention results in consistent stapling of the casings to the structural frame assemblies. That is, the staples are driven in with substantially the same force, and at the same spacing, in each product produced by the machines and methods.

Yet another advantage is that the machines and methods according to this invention are adaptable to receive structural frame assemblies and casing of different sizes, including frames of different heights and widths, casings of different widths and jambs of different widths. Thus, a single machine can be employed to attach different size casings on different size structural frame assemblies. Moreover, the machines according to this invention can be designed to accept door jamb assemblies and casings built in accordance with the metric system, or machines built for the United States measurement system can be relatively easily converted to handle door jamb assemblies built in accordance with metric measurements.

Furthermore, because of the semi-automatic nature of the machines in accordance with this invention, the risk of injury is greatly reduced. The persons operating the machines are not required to be in or around the machine when the clamping and stapling process occurs. This greatly reduces the risk of injury to those persons.

Another advantage of this invention is that employment of the machines and methods in accordance with this invention greatly reduces the labor time, skill level and cost needed to attach casings to a structural frame assembly. Essentially, technology is replacing steps in the construction industry previously conducted by manual labor.

A further advantage of this invention is that the stapling units of the machines can be oriented to drive the staples which fasten the casing to the door jamb assembly in across the grain of the casing. Staples driven in across the grain provide a more secure attachment of the casing to the door jamb assembly than staples driven with the grain, i.e. such staples have a higher resistance to failure. Also, the risk of the casing splintering during the attachment of the casing to the door jamb assembly is greatly reduced by orienting the staples across the grain of the casing.

Other advantages and salient features of the invention will become apparent from this disclosure. Certain embodiments of this invention will now be described with respect to the drawings, wherein:

BRIEF DESCRIPTION OF THE DRAWINGS

FIG. 9 is a side view of an embodiment of the clamping assemblies of the fixed and movable banks of stapling unit assemblies of the embodiment of this invention illustrated in FIG. 1.

FIG. 10 is a partial end view of the clamping assembly illustrated in FIG. 9.

FIG. 11 is a partial top view of the clamping assembly illustrated in FIGS. 9 and 10.

FIG. 15 is a perspective view of the air cylinder assembly of the movable bank of the embodiment illustrated in FIG. 1 which rotates the pivot bar of the movable bank.

FIG. 16 is a perspective view of an embodiment of the air cylinder assembly which locks the movable frame to the bottom support frame assembly of the embodiment of this invention illustrated in FIG. 1.

FIG. 17 is a perspective view of an embodiment of the trim guide assembly and right side clamping assembly of the head bank of stapling units of the embodiment of this invention illustrated in FIG. 1.

FIGS. 36A–F illustrate, partially in schematic, the steps of a method of employing the embodiment of this invention illustrated in FIGS. 1–32, 34 and 35.

DETAILED DESCRIPTION OF THE INVENTION

Figure 1:
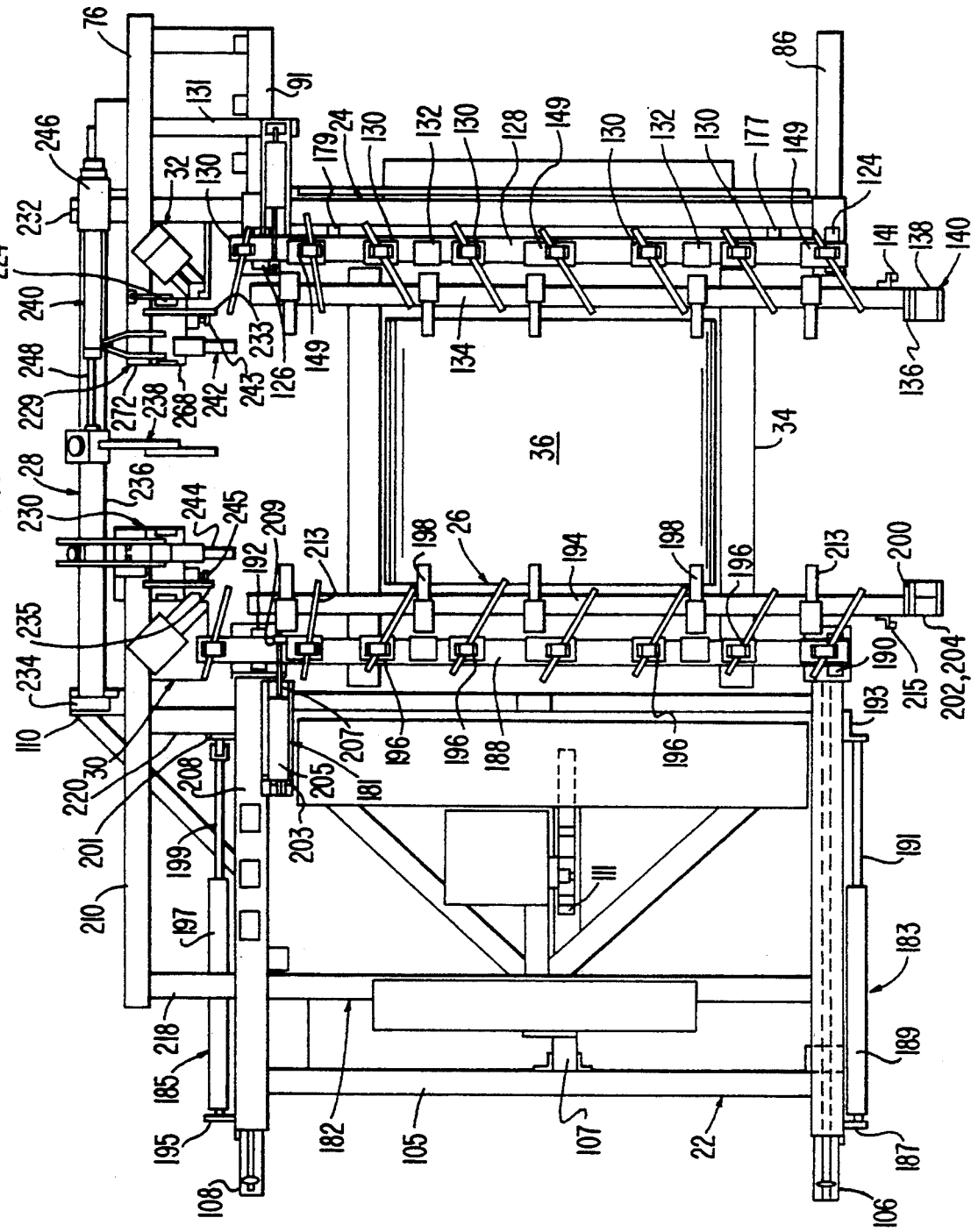
FIG. 1 is a top view, partially schematic, of a casing attachment machine in accordance with this invention.

Referring to the Figures, in particular FIG. 1, a casing attachment machine is provided in accordance with this invention, casing attachment machine 20, which includes support frame assembly 22, fixed bank of stapling units 24, movable bank of stapling units 26, head bank of stapling units 28, corner splicing assemblies 30 and 32, lifting assembly 34 and conveyor belt assembly 36.

SUPPORT FRAME ASSEMBLY

Figure 2:
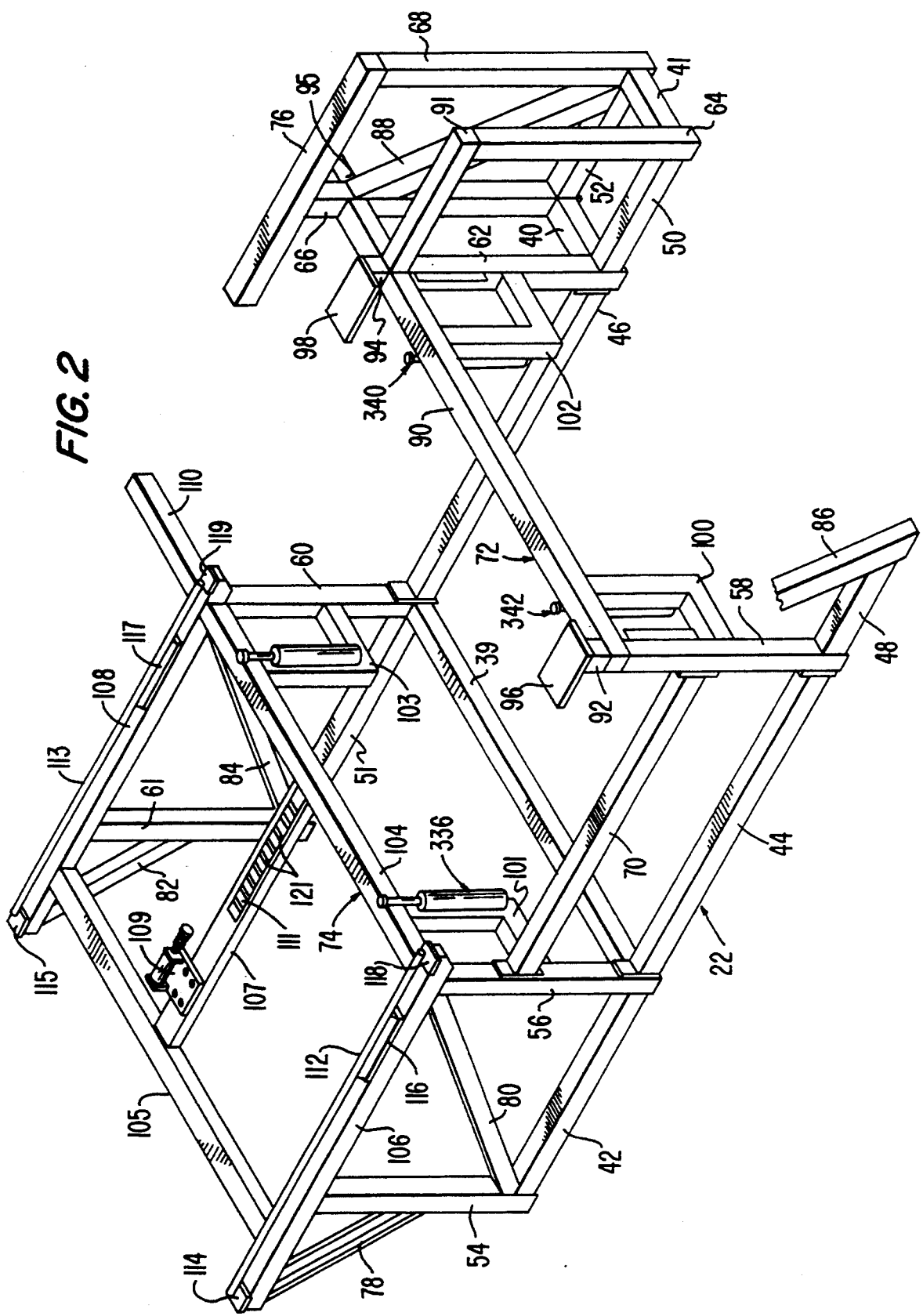
FIG. 2 is a perspective view of the bottom support frame assembly of the embodiment of this invention illustrated in FIG. 1.

Support frame assembly 22 is illustrated in detail in FIG. 2 and includes longitudinal base members 39, 40 and 41, lateral base members 42, 44, 46, 48, 50, 51 and 52, upright members 54, 56, 58, 60, 61, 62, 64, 66 and 68, end support member 70, fixed bank support assembly 72, movable bank support assembly 74, head bank support beam 76 and diagonal support beams 78, 80, 82, 84, 86 and 88.

Fixed bank support assembly 72 includes longitudinal beam 90, lateral beam 91, beam caps 92 and 94, beam extension 95, support plates 96 and 98 and L-shaped members 100 and 102.

Movable bank support assembly 74 includes longitudinal beams 104 and 105, lateral beams 106, 107 and 108, beam extension 110, rods 112 and 113, rod supports 114–119, bumper assembly 109, spacer bar 111 and L-shaped members 101 and 103.

In this embodiment, longitudinal members 39, 40, 41, 90, 104 and 105, lateral members 42, 44, 46, 48, 50, 51, 52, 91, 106, 107 and 108, end support member 70, head bank support beam 76 and beam extensions 95 and 110 are substantially horizontal and upright members 54, 56, 58, 60, 61, 62, 64, 66 and 68 are substantially vertical.

Longitudinal base member 39 is connected at its ends to the lower ends of upright members 56 and 60. Longitudinal base member 40 is attached at its ends to the lower ends of upright members 62 and 66. Longitudinal base member 41 is attached at its ends to the lower ends of upright members 64 and 68.

Lateral base member 42 is connected on its ends to the lower ends of upright members 54 and 56. Lateral base member 44 is attached on its ends to the lower ends of upright members 56 and 58. Lateral base member 46 is attached at its ends to the lower ends of upright members 60 and 62. Lateral base member 48 is attached on its ends to the lower ends of upright member 58 and diagonal support beam 86. Lateral base member 50 is attached on its ends to the lower ends of upright member 62 and 64. Lateral base member 51 is attached on its ends to the lower ends of upright members 60 and 61. Lateral base member 52 is attached at its ends to the lower ends of upright members 66 and 68.

End support member 70 is attached at its ends to upright members 56 and 58, immediate the ends of upright members 56 and 58, and is oriented approximately parallel to lateral base member 44.

Head bank support beam 76 is attached to the upper ends of upright members 66 and 68 and extends from upright member 68, inward past upright member 66.

Diagonal support beam 78 is connected on its ends to upright member 54, intermediate the ends of upright member 54, and the outer end of lateral beam 106. Diagonal support beam 80 is connected on its ends to 1) the lower end of upright member 54 and one end of lateral base member 42 and 2) the upper end of upright member 56. Diagonal support beam 82 is attached on its ends to upright member 61, intermediate the ends of upright member 61, and the outer end of lateral beam 108. Diagonal support beam 84 is attached at its ends to 1) the lower end of upright member 61 and one end of lateral base member 51 and 2) the upper end of upright member 60. Diagonal support beam 86 is connected on its ends to the outer end of lateral base member 48 and the upper end of upright member 58. Diagonal support beam 88 is connected on its ends to the end of lateral base member 52 adjacent the lower end of upright member 68 and upright member 66.

Longitudinal beam 90 of fixed bank support assembly 72 is attached at one end to the top of upright member 58 and at the other end to upright member 66, intermediate the ends of upright member 66. Lateral beam 91 is attached on one end to the top of upright member 64 and the other end is attached to longitudinal beam 90. Beam caps 92 and 94 are attached on top of longitudinal beam 90 as shown in FIG. 2. Beam extension 95 is attached on one end to upright member 66 and extends forward therefrom. Support plates 96 and 98 are fixed on top of beam caps 92 and 94, respectively, and are oriented substantially horizontal. L-shaped members 100 and 102 extend between and are connected on their ends to longitudinal beam 90 and upright members 58 and 62 and form closed frames with those members.

Lateral beam 106 of movable bank support assembly 74 is connected to the upper ends of diagonal support beam 78 and upright members 54 and 56. Lateral beam 108 is connected to the upper ends of diagonal support beam 82 and upright members 61 and 60. Longitudinal beam 104 is connected at its ends to lateral beams 106 and 108, near the inner ends of those beams. Longitudinal beam 105 is connected at its ends to lateral beams 106 and 108. Lateral beam 107 is connected at its ends to longitudinal beams 104 and 105, substantially at the middle of longitudinal beam 104 and 105. Beam extension 110 is attached one end to lateral beam 108 and extends forward thereof.

L-shaped members 101 and 103 extend between and are connected on their ends to longitudinal member 104 and upright members 56 and 60 and form closed frames with those members.

Rod supports 114, 116 and 118 are affixed to the top of lateral beam 106. Rod supports 115, 117 and 119 are affixed to the top of lateral beam 108. Rod 112 is attached on top of rod supports 114, 116 and 118, substantially parallel to lateral beam 106. Rod 113 is attached on top of rod supports 115, 117 and 119, substantially parallel to lateral beam 108.

Figure 3:
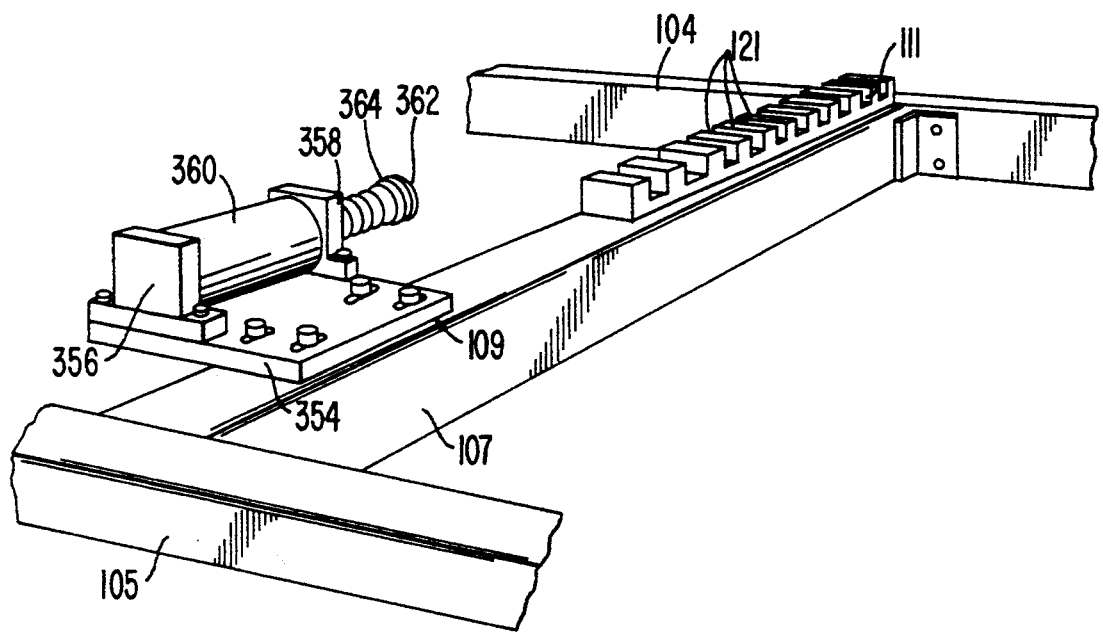
FIG. 3 is a partial perspective view of the bottom support frame assembly illustrated in FIG. 2, illustrating the bumper assembly and the spacer bar.

Bumper assembly 109 includes base plate 354, end plates 356 and 358, housing 360, plunger 362 and spring 364 (see FIG. 3). Base plate 354 is a flat plate attached to the top of lateral beam 107 near the outer end of lateral beam 107. Base plate 354 is oriented substantially horizontal and extends from lateral beam 107 off to one side of lateral beam 107. End plates 356 and 358 are attached to the rearward and forward edges of base plate 354 and extend upward therefrom, in parallel. Housing 360 is a hollow cylinder and extends between end plates 356 and 358. Plunger 362 is slidably received in and supported by housing 360 and extends forwardly therefrom. Spring 364 is a helicoidal spring wrapped around the forward end of plunger 362.

Bumper assembly 109 is designed to stop movable bank of stapling units 26 and absorb some of the force involved in stopping movable bank 26 when movable bank 26 moves from an inner position to its outermost position, as discussed below. Bank 26 will contact plunger 362, thus compressing spring 364.

Spacer bar 111 is attached to the top of lateral beam 107 at the forward end thereof and extends longitudinally along lateral beam 107 as illustrated in FIG. 3. Spacer bar 111 has a plurality of spaced teeth 121 extending upward therefrom. Plunger 430 of air cylinder lock assembly 225 is received between adjacent teeth 121 to lock movable bank of stapling units 26 in a fixed position relative support frame assembly 22, as discussed below (see also FIG. 16).

FIXED BANK OF STAPLING UNITS

Fixed bank of stapling units 24 includes end support blocks 120 and 122, pivot bar bearing assemblies 124 and 126, pivot bar 128, air cylinder assembly 129, a plurality of stapling unit assemblies 130, a plurality of clamping assemblies 132, a plurality of combined stapling and clamping assemblies 149, jamb locator 134, air cylinder support plate 136, upper air cylinder assembly 138, lower air cylinder assembly 140, trim guide pole 141 and air cylinder assemblies 177 and 179 (see FIGS. 1, 4–13 and 35).

Figure 4:
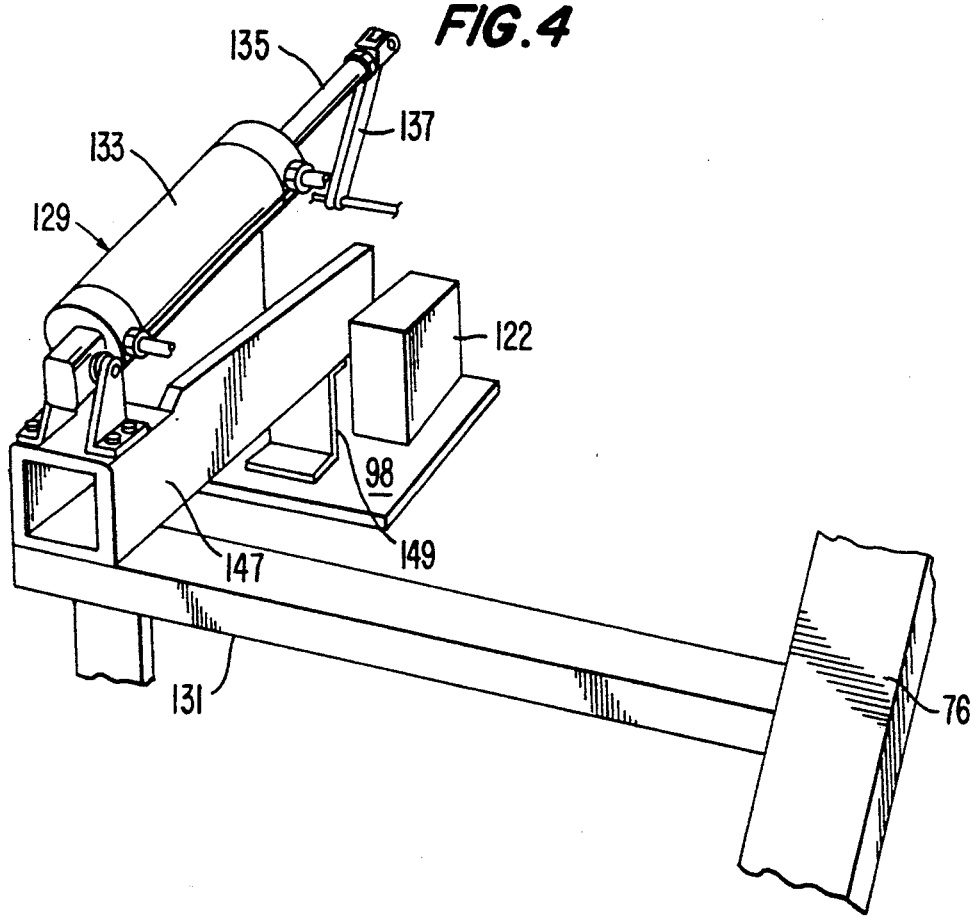
FIG. 4 is a partial perspective view of the fixed bank of stapling units of the embodiment illustrated in FIG. 1, illustrating the air cylinder assembly which rotates the pivot bar of the fixed bank.
Figure 12:
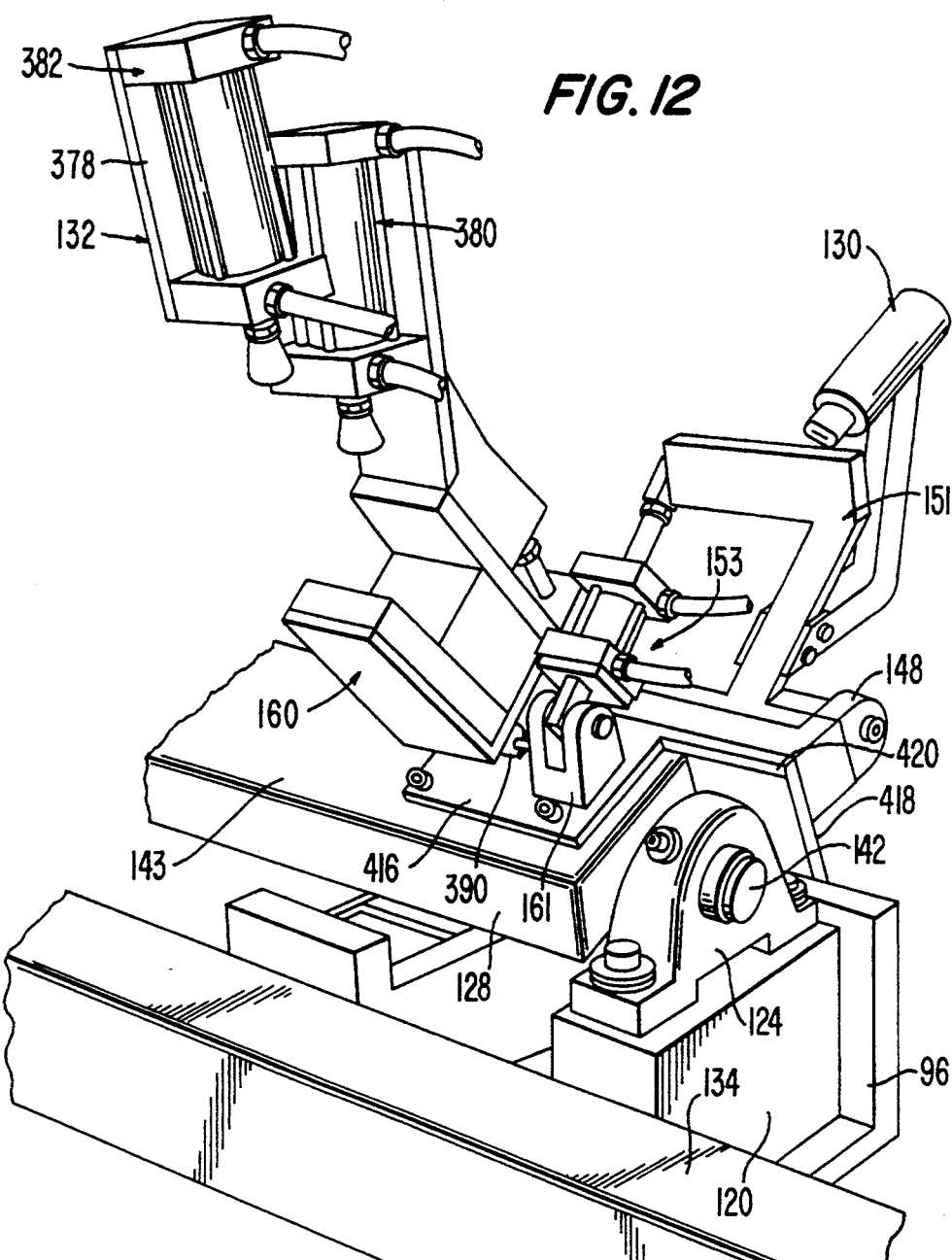
FIG. 12 is a perspective view of an embodiment of the combined stapling and clamping unit assemblies of the fixed and movable banks of stapling unit assemblies of the embodiment of this invention illustrated in FIG. 1.

End support blocks 120 and 122 are affixed to the top of support plates 96 and 98, respectively, of support frame assembly 22 (see FIGS. 4 and 12). Pivot bar bearing assemblies 124 and 126 are affixed to the top of end support blocks 120 and 122, respectively. Pivot bar 128 extends between and has its ends rotatably received in pivot bar bearing assemblies 124 and 126.

Figure 28:
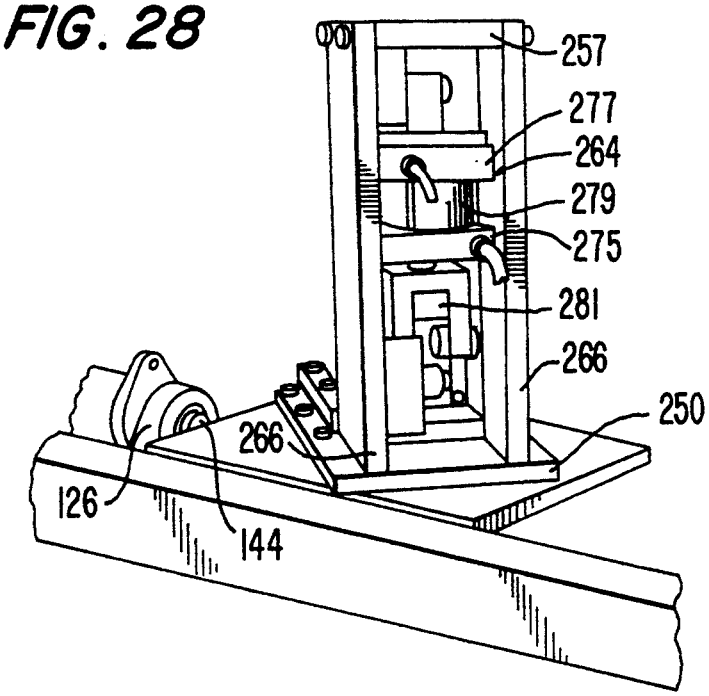
FIG. 28 is a rear perspective view of the embodiment of the corner splicing assembly illustrated in FIGS. 25–27.

Pivot bar 128 has an outer square cross section along all of its length, except for cylindrical ends 142 and 144 (see FIGS. 4, 12 and 28). The square cross section provides four surfaces, including surfaces 143 and 145 (see FIGS. 5 and 6), which are perpendicularly oriented and joined on edge. Cylindrical ends 142 and 144 are rotatably received in pivot bar bearing assemblies 124 and 126, respectively. In this embodiment, pivot bar 128 is an integral member.

Air cylinder assembly 129 includes support member 131, support member 139, support arms 147, air cylinder 133, extendable and retractable plunger 135 and gusset plate 137 (see FIGS. 1 and 4). Support member 131 is a small beam which extends between and is attached to the underside of head bank support beam 76 and to the top of lateral beam 91 and is oriented perpendicularly to support beam 76 and lateral beam 91. Support member 139 is attached to and supported by support plate 98. Support arms 147 are a pair of spaced, parallel plates which extend between and are supported on their ends by support member 131 and support member 139. The end of air cylinder 133 opposite plunger 135 is rotatably attached to the outer end of support arms 147. Plunger 135 extends from one end of air cylinder 133 and is driven by air cylinder 133.

Gusset plate 137 is fixedly attached to surface 145 of pivot arm 128 and extends outwardly therefrom. The free end of plunger 135 is rotatably attached to gusset plate 137. The extension and retraction of plunger 135 causes gusset plate 137, and thus pivot bar 128 and fixed bank 24, to rotate about the axis of pivot bar 128 (see FIG. 4). Fixed bank 24 is in an up position when plunger 135 is retracted and in a down position when plunger 135 is extended.

Stapling unit assemblies 130, clamping assemblies 132 and combined stapling and clamping assemblies 149 are spaced along pivot bar 128, as illustrated in FIG. 1.

Stapling unit assemblies 130 each include angle plate 146, end brackets 148, magazine 150, Z-bar 151, stapler 152, air cylinder assembly 153, pins 367 and pin and bracket assembly 369 (see FIGS. 5–8). Angle plate 146 is an elongated angle which is affixed to pivot bar 128. Angle plate 146 has flanges 123 and 125. Flange 123 overlaps surface 143 and flange 125 overlaps surface 145 of pivot bar 128 (see FIG. 6). End brackets 148 extend upwards along the side edges of flange 125.

Figure 7:
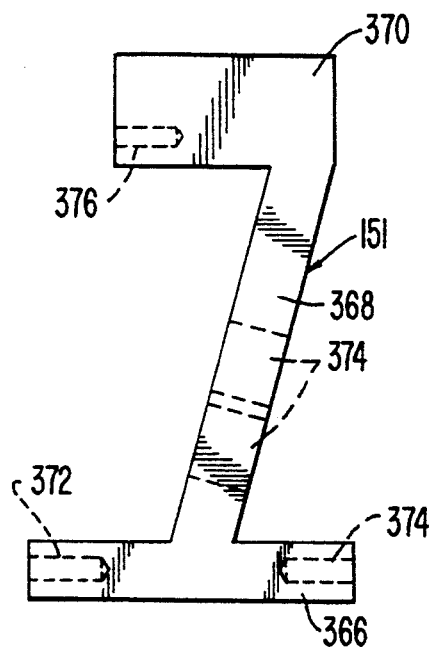
FIG. 7 is a plan view of the Z-bar which can be employed in the stapling unit assembly illustrated in FIGS. 5 and 6.
Figure 8:
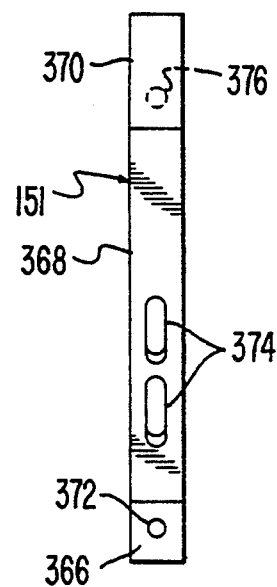
FIG. 8 is a side view of the Z-bar illustrated in FIG. 7.

In this embodiment, Z-bar 151 includes base arm 366, middle arm 368 and top arm 370 (see FIGS. 7 and 8). Base arm 366 and top arm 370 are spaced, substantially in parallel. Middle arm 368 extends diagonally between base arm 366 and top arm 370. Base arm 366 has bores 372 in each end. Middle arm 368 has slots 374 therein. Top arm 370 has bore 376 therein.

Base arm 366 of Z-bar 151 extends between and is rotatably connected to end brackets 146, pins 367 being received through end brackets 146 and in bores 376 of base arm 366. Stapler 152 is fixedly attached to middle arm 368 by pin and bracket assembly 369. The pins of pin and bracket assembly 369 are received through slots 374 in middle arm 368.

Stapler 152 includes an anvil head 154 from which the staples are ejected. Stapler 152 is a model sold by BEA. Such staplers are well known in this art, and thus stapler 152 is not illustrated or described in detail herein.

Magazine 150 extends from anvil head 154 rearward of the assembly, under Z-bar 151 and between end brackets 148. Magazine 150 houses a plurality of staples which are automatically fed to stapler 152.

Air cylinder assembly 153 includes air cylinder 155, bracket 161, end walls 169 and 171, and retractable and extendable plunger 157. End walls 169 and 171 are affixed in parallel. Air cylinder 155 is received between end walls 169 and 171 and attached thereto. Plunger 157 extends outward from and is driven by air cylinder 155. Plunger 157 extends through end wall 171.

Bracket 161 is attached to flange 123 of angle plate 146. End wall 169 is rotatably attached to bracket 161. The free end of plunger 157 is rotatably attached to top arm 370 of Z-bar 151 by a pin received in bore 376.

Thus, as air cylinder 155 operates, it retracts and extends plunger 157. This, in turn, rotates Z-bar 151 and the entire stapling unit 130 about arm 366 of Z-bar 151 between an up position illustrated in FIG. 5 (when plunger 157 is retracted) and a down position illustrated in FIG. 6 (when plunger 157 is extended).

Clamping assemblies 132 each include angle bracket 156, L-shaped support bracket 158, channel bracket 160, protective material 162, air cylinder assembly 164, plate 378, upper air cylinder assembly 380 and lower air cylinder assembly 382 (see FIGS. 9–11).

Angle bracket 156 is affixed to pivot bar 128 and includes flanges 384 and 386 and brackets 388 and 390. Flange 384 overlaps surface 145 and flange 386 overlaps surface 143 of pivot bar 128. Bracket 388 is attached to flange 384 and extends outwardly therefrom. Bracket 390 is attached to flange 386 and extends outwardly therefrom.

Channel bracket 160 includes web 392, bottom flange 394, top flange 396 and bracket 398. Bracket 398 is attached to web 392 and is also rotatably attached to bracket 390 of angle bracket 156. Protective material 162 is placed in channel bracket 160 as a protective layer along the interior surfaces of web 392 and bottom flange 394. The size of the protective material 162 may vary depending on the size of the casing being attached to the door frame assembly. Protective material 162 is readily removable from channel bracket 160 so that different sizes may be inserted.

L-shaped bracket 158 includes base 163, upright plate 165 and bracket 167. Upright plate 165 is attached to the upper surface of top flange 396 of channel bracket 160, on edge, and extends upward therefrom. Base 163 is attached to the angled lower edge of upright plate 165, substantially perpendicular to upright plate 165, as illustrated in FIG. 9. Bracket 167 is attached to upright plate 165 and extends on each side of upright plate 165, above channel bracket 160.

Air cylinder assembly 164 includes air cylinder 166, extendable and retractable plunger 168 and end walls 173 and 175. End walls 173 and 175 are affixed in parallel. Air cylinder 166 extends between and is attached to end walls 173 and 175. End wall 173 is rotatably attached to bracket 388. Plunger 168 extends out one end of air cylinder 166, through end wall 175, and is driven by air cylinder 166. The free end of plunger 168 is rotatably attached to bracket 167 of L-shaped bracket 158.

Thus, the operation of air cylinder 166 causes plunger 168 to extend and retract, rotating L-shaped support bracket 158, channel bracket 160, upper air cylinder assembly 380 and lower air cylinder assembly 382 about bracket 390 between an up position (when plunger 168 is retracted, see FIG. 12) and a down position (when plunger 168 is extended, see FIG. 9).

Upper air cylinder assembly 380 includes end walls 400 and 402, air cylinder 404 and plunger 406. End walls 400 and 402 are attached to the underside of base plate 163 of L-shaped support bracket 158, on edge and in parallel. Air cylinder 404 extends between and is supported by end walls 400 and 402. Plunger 406 extends out of air cylinder 404, through end wall 400. Plunger 406 is extended and retracted by air cylinder 404.

Plate 378 is attached to end walls 400 and 402 of air cylinder assembly 380 and extends vertically therefrom.

Lower air cylinder assembly 382 includes end walls 408 and 410, air cylinder 412 and plunger 414. End walls 408 and 410 are attached to plate 378, on edge and in parallel. Air cylinder 412 is received between and supported by end walls 408 and 410. Plunger 414 extends out of air cylinder 412, through end wall 408. Plunger 414 is extended and retracted by air cylinder 412.

Plungers 406 and 414 have retracted positions wherein the free ends of the plungers do not contact the casing inserted in channel brackets 160 and extended positions wherein the plungers press the casing inserted in channel brackets 160 against the appropriate Jambs, as discussed below (see also FIG. 9).

Combined stapling and clamping assemblies 149 essentially include a stapling unit 130 and a clamping assembly 132 attached to a common base plate, base plate 416 (see FIG. 12).

Base plate 416 is attached to pivot bar 128 and is an angle which includes flanges 418 and 420. Flanges 418 and 420 overlap surfaces 143 and 145 of pivot bar 128, respectively. The remaining elements of combined stapling and clamping assemblies 149 are the same as stapling units 130 and clamping assemblies 132. Bracket 161 of stapling unit 130 and bracket 390 of clamping assembly 132 are integral with flange 416. End brackets 148 of stapling unit 130 and bracket 388 of clamping assembly 132 are integral with flange 418.

Figure 6:
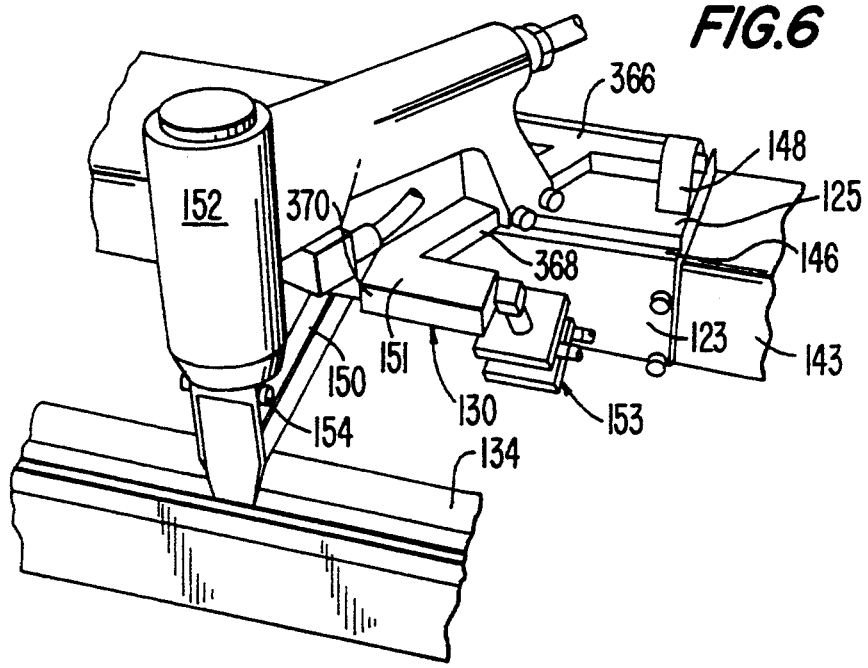
FIG. 6 is a top perspective view of the stapling unit assembly illustrated in FIG. 5.

Jamb locator 134 is fixedly attached to support plates 96 and 98 (see FIGS. 1, 6 and 12). Jamb locator 134 has a generally square cross section with a smooth interior face. Plates can be attached on top of jamb locator 134 to vary the "height" of jamb locator 134. The desired "height" of jamb locator 134 depends on the dimensions of the jambs of the door frame assembly to which casing is to be attached by casing attachment machine 20.

Figure 13:
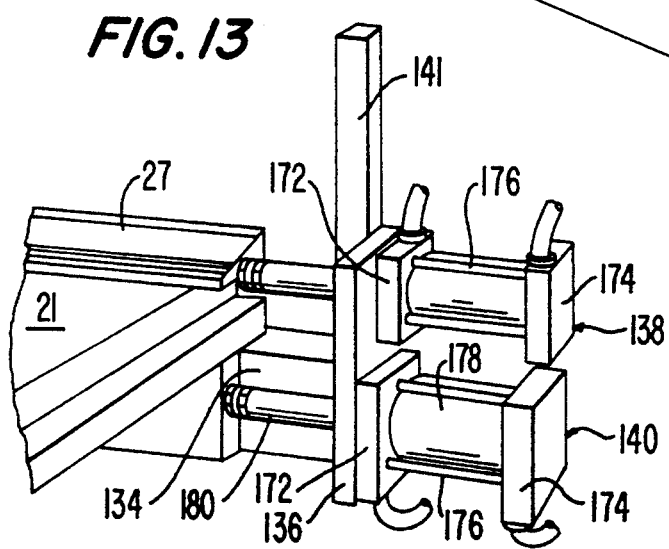
FIG. 13 is a perspective view of an embodiment of the trim guide pole and end air cylinder assemblies, which align the casing and structural frame assembly longitudinally in the casing attachment machine, of the fixed and movable banks of the embodiment of this invention illustrated in FIG. 1.

Air cylinder support plate 136 is attached to the end of jamb locator 134 opposite head bank of stapling units 28, and is oriented perpendicular to the longitudinal axis of jamb locator 134 (see FIGS. 1 and 13). Support plate 136 has holes therein to receive plungers 180, as discussed below.

Upper air cylinder assembly 138 and lower air cylinder assembly 140 comprise the same elements. Each air cylinder assembly 138 and 140 includes base plate 172, end plate 174, a plurality of spaced, parallel longitudinal rods 176, air cylinder 178 and retractable and extendable plunger 180 (see FIG. 13).

Base plate 172 is fixedly attached to air cylinder support plate 136 on the exterior side of plate 136. Longitudinal rods 176 are attached on one end to base plate 172. End plate 174 is attached to the other ends of longitudinal rods 176, such that rods 176 space base plate 172 and end plate 174 in parallel.

Air cylinder 178 is positioned between and supported by base plate 172 and end plate 174, within the "cage" formed by longitudinal rods 176. Plunger 180 extends out one end of air cylinder 178, through holes in base plate 172 and support plate 136, and is driven by air cylinder 178.

The free end of plunger 180 of upper air cylinder assembly 138 is designed to engage the casing and the free end of plunger 180 of lower air cylinder assembly 140 is designed to engage the jamb when a door frame assembly and casing are properly received in casing attachment machine 20 and the plungers are in their respective extended positions, as discussed below.

Trim guide pole 141 is a straight hollow, square pole attached on one side of jamb locator 134, near air cylinder assemblies 138 and 140 (see FIGS. 1 and 13). Trim guide pole 141 is oriented vertically and positioned such that an end of casing received in casing assemblies 132 and combined stapling and casing assemblies 149 will abut trim guide pole 141 when the casing assemblies 132 and combined stapling and casing assemblies 149 are in their up position, as discussed below.

Figure 35:
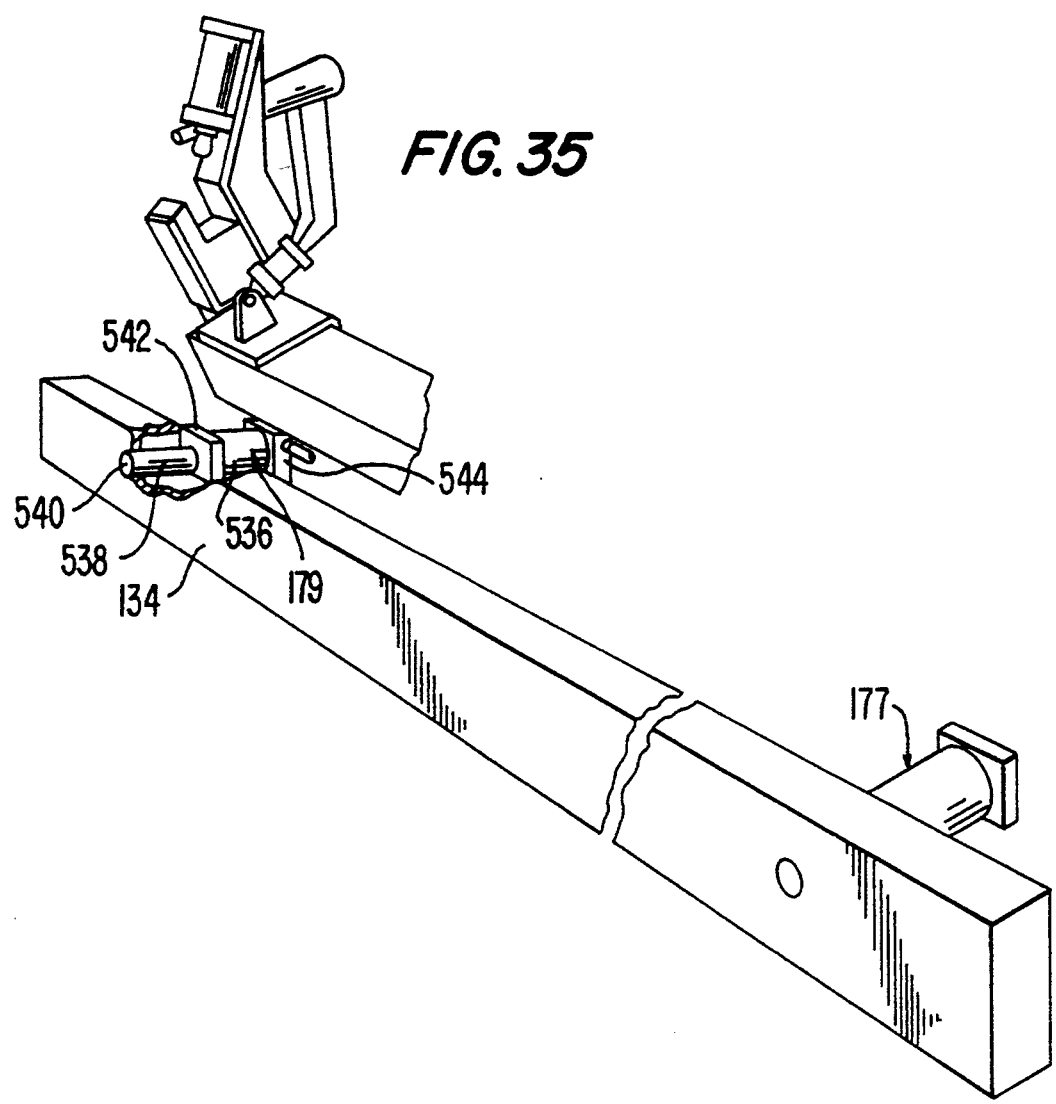
FIG. 35 is a partial perspective view, partially cut away for clarity, of the fixed bank of stapling units of the embodiment of this invention illustrated in FIG. 1.

Air cylinder assemblies 177 and 179 each include air cylinder 536, plunger 538, stop 540 and end walls 542 and 544 (see FIG. 35). End wall 542 is attached to jamb locator 134, substantially perpendicular to the longitudinal axis of jamb locator 134. End wall 544 is affixed to end wall 542 in a parallel relationship. Air cylinder 536 is positioned between and supported by end walls 542 and 544. Plunger 538 is driven by air cylinder 536 and extends outward therefrom through end wall 542. Stop 540 is attached to the free end of plunger 538 and is received in a hole in the interior surface of jamb locator 134. When plunger 538 is in its retracted position, the outer surface of stop 540 is flush with the interior surface of jamb locator 134. When plunger 538 is extended, stop 540 moves inwardly from jamb locator 134.

MOVABLE BANK OF STAPLING UNITS

Movable bank of stapling units 26 includes slidable frame assembly 182, air cylinder assemblies 183 and 185, end support blocks 184 and 186, pivot bar 188, air cylinder assembly 181, pivot bar bearing assemblies 190 and 192, jamb locator 194, a plurality of stapling unit assemblies 196, a plurality of clamping assemblies 198, a plurality of combined stapling and clamping assemblies 213, air cylinder support plate 200, upper air cylinder assembly 202, lower air cylinder assembly 204 and trim guide pole 215 (see FIGS. 1 and 14–16).

Figure 14:
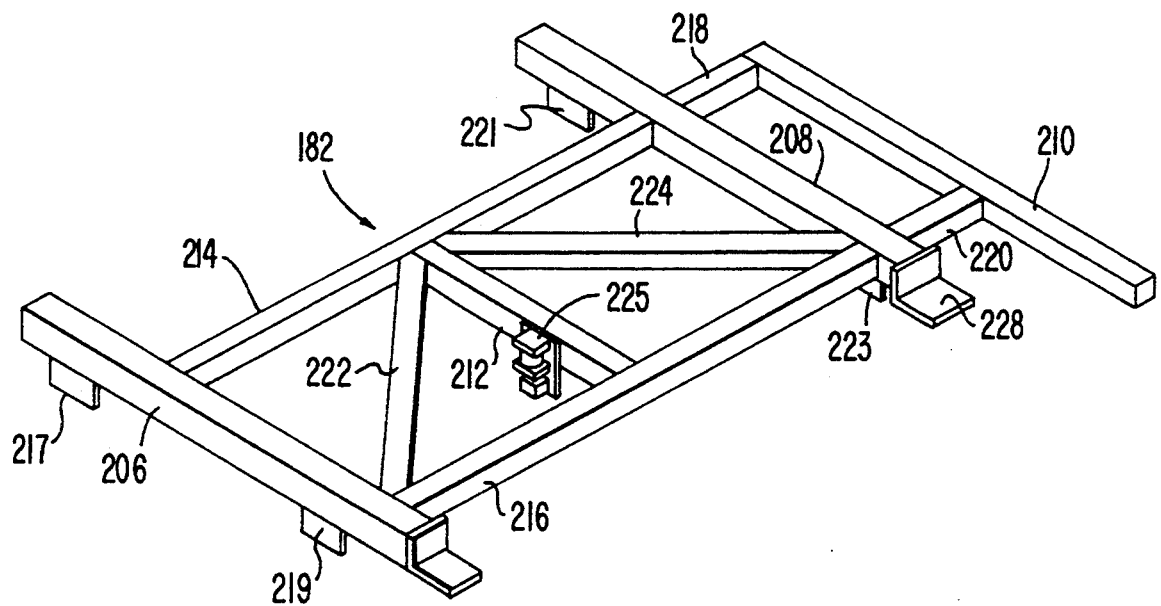
FIG. 14 is a perspective view of an embodiment of the slidable frame assembly of the movable bank of the embodiment of this invention illustrated in FIG. 1.

Slidable frame assembly 182 includes main lateral members 206 and 208, top lateral member 210, middle lateral member 212, longitudinal members 214 and 216, short longitudinal members 218 and 220, diagonal support members 222 and 224, angle sections 226 and 228, pillow blocks 217, 219, 221 and 223 and air cylinder lock assembly 225 (see FIG. 14).

Longitudinal members 214 and 216 extend between and are attached on their ends to main lateral members 206 and 208. Main lateral members 206 and 208 are spaced in parallel by longitudinal members 214 and 216. Middle lateral member 212 extends between and is attached on its ends to the approximate centers of longitudinal members 214 and 216. Diagonal support members 222 and 224 extend from the internal corners formed by longitudinal member 214 and middle lateral member 212 to the corners formed by longitudinal member 216 and main lateral members 206 and 208, respectively. Short longitudinal members 218 and 220 extend between and are attached on their ends to main lateral member 208 and top lateral member 210. Short longitudinal members 218 and 220 are positioned such that they are aligned with longitudinal members 214 and 216, respectively. Top lateral member 210 is attached to the ends of short longitudinal members 218 and 220 and is oriented parallel to lateral members 206 and 208. Angle sections 226 and 228 are attached to the interior ends of main lateral members 206 and 208, respectively, such that one flange abuts the ends of members 206 and 208 and the other flange is oriented horizontally.

Air cylinder assembly 183 includes end plate 187, air cylinder 189, extendable and retractable plunger 191 and angle section 193 (see FIG. 1).

Extendable and retractable plunger 191 extends out from and is driven by air cylinder 189. End plate 187 is attached on one edge to lateral beam 106 of support frame assembly 22 and extends substantially perpendicular thereto. The end of air cylinder 189 opposite plunger 191 is attached to end plate 187. Air cylinder 189 is oriented substantially parallel to lateral beam 106. One flange of angle section 193 is attached to main lateral member 206 of slidable frame assembly 182. The free end of plunger 191 is attached to the other flange of angle section 193.

Air cylinder assembly 185 includes end plate 195, air cylinder 197, extendable and retractable plunger 199 and end plate 201 (see FIG. 1).

Plunger 199 extends out of and is driven by air cylinder 197. End plate 195 is attached on one edge to lateral beam 108 of support frame assembly 22 and extends substantially perpendicular thereto. The end of air cylinder 197 opposite plunger 199 is attached to end plate 195 and is oriented substantially parallel to lateral beam 108. End plate 201 is attached to short longitudinal member 220 of slidable frame assembly 182. The free end of plunger 199 is attached to end plate 201.

Air cylinder assemblies 183 and 185 slide slidable frame assembly 182 relative support frame assembly 22, as discussed in detail below, since the ends of air cylinders 189 and 197 opposite plungers 191 and 199 are attached to frame assembly 22 and plungers 191 and 199 are attached to slidable frame assembly 182. When plungers 191 and 199 are retracted, frame assembly 182, and thus movable bank 26, is in the retracted position. When plungers 191 and 199, are extended, frame assembly 182, and thus movable bank 26, is in its innermost position.

Figure 19:
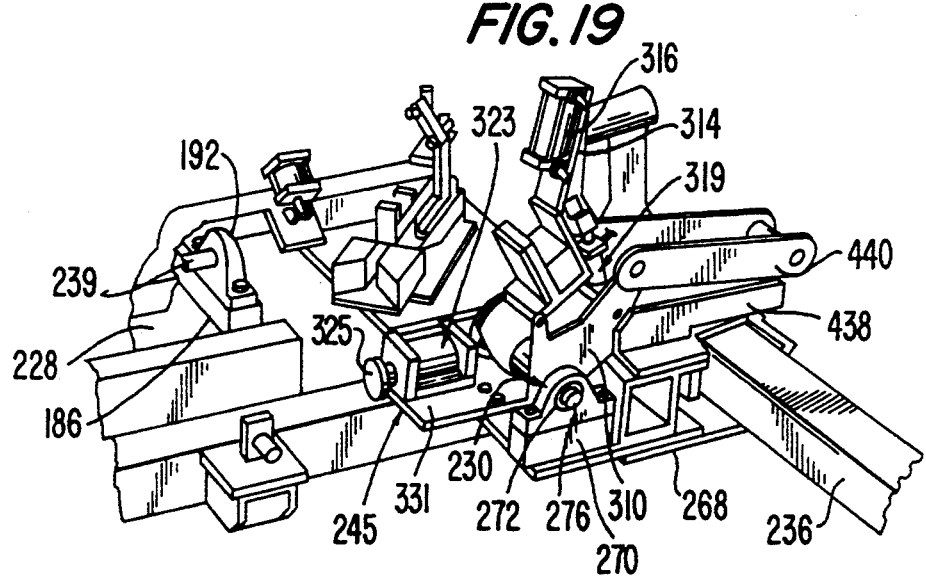
FIG. 19 is a perspective view, partially cut away for clarity, of an embodiment of the left side clamping assembly and left side ejection air cylinder assembly of the head bank of the embodiment of this invention illustrated in FIG. 1.
Figure 32:
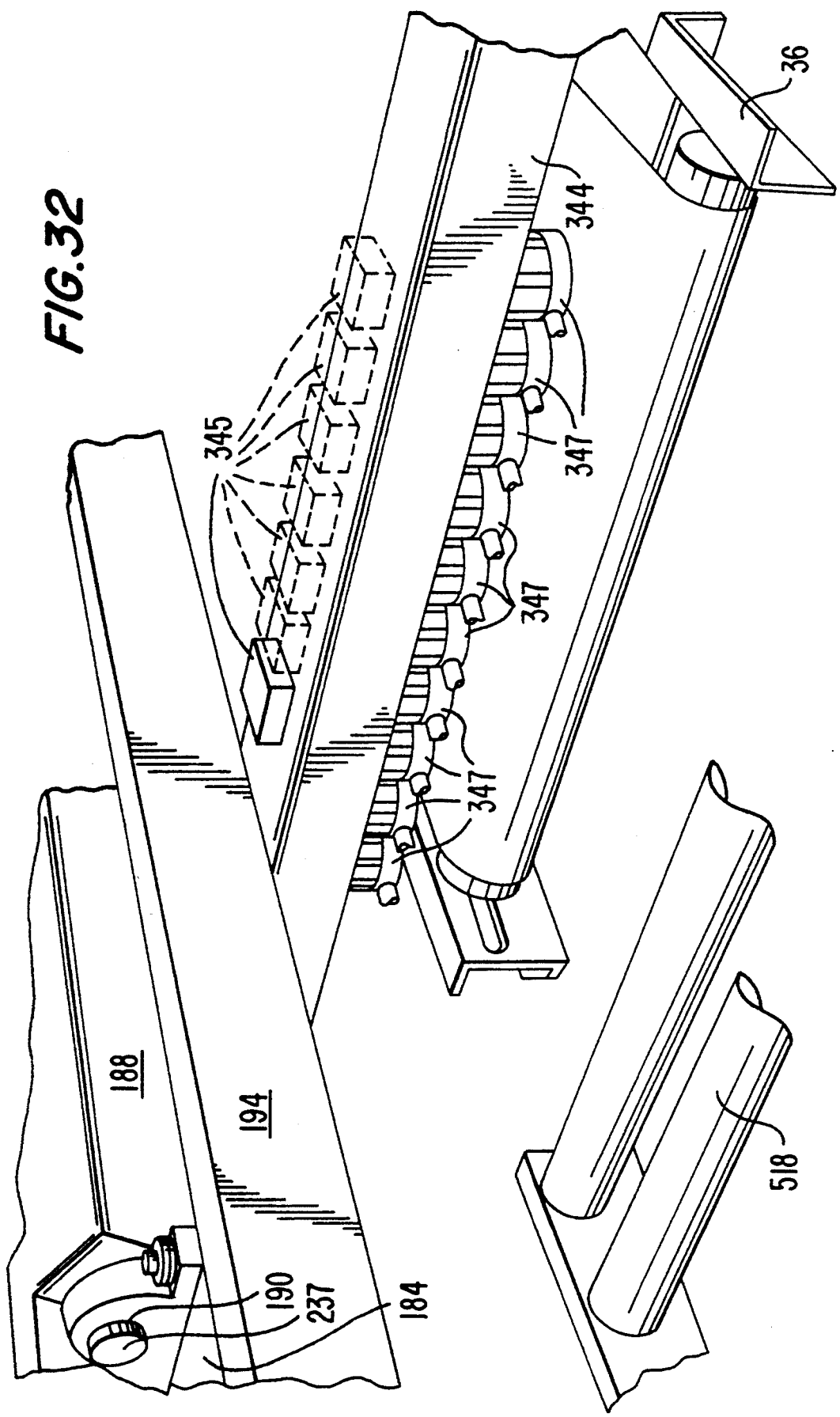
FIG. 32 is a partial perspective view of the assembly for raising and lowering the structural frame assembly illustrated in FIG. 31, illustrating one of the support squares in the up position.

End support blocks 184 and 186 are affixed to the interior surfaces of angle sections 226 and 228, respectively (see FIGS. 19 and 32). Pivot bar bearing assemblies 190 and 192 are attached to the top of end support blocks 184 and 186, respectively.

Pivot bar 188 extends between and is rotatably received within pivot bar bearing assemblies 190 and 192. Pivot bar 188 has a square outer cross section along all of its length, except for cylindrical ends 237 and 239. Cylindrical ends 237 and 239 are rotatably received within pivot bar bearing assemblies 190 and 192, respectively.

Pillow blocks 217 and 219 are attached to the under side of main lateral member 206 and slidably receive rod 112 therein. Pillow blocks 221 and 223 are attached to the underside of main lateral member 208 and slidably receive rod 113 therein.

Air cylinder lock assembly 225 includes base plate 422, end walls 424 and 426, air cylinder 428 and extendable and retractable plunger 430 (see FIG. 16). Base plate 422 is attached to middle lateral member 212 and extends vertically downward therefrom. End walls 424 and 426 are attached on edge to base plate 422 and extend horizontally therefrom, in parallel. Air cylinder 428 is received between and supported by end walls 424 and 426. Plunger 430 extends downward from air cylinder 428, through end wall 426 and is retracted and extended by air cylinder 428. The free end of plunger 430 is designed to be received between and engage adjacent teeth 121 of spacer bar 111 when plunger 430 is in the down position.

When plunger 430 engages teeth 121, movable bank 26 is held in a fixed position relative support frame assembly 22. When plunger 430 is retracted, plunger 430 disengages teeth 121 and movable bank 26 is free to move relative support frame assembly 22 (see FIG. 3).

Air cylinder assembly 181 includes support member 203, air cylinder 205, extendable and retractable plunger 207, gusset plate 209 and bracket 211 (see FIG. 15).

Support member 203 is attached to main lateral member 208 of slidable frame assembly 182 and extends parallel to main lateral member 208. Plunger 207 extends from and is driven by air cylinder 205. The end of air cylinder 205 opposite plunger 207 is rotatably attached to support member 203 by bracket 211. Gusset plate 209 is affixed to pivot bar 188. The free end of plunger 207 is rotatably attached to gusset plate 209. The extension and retraction of plunger 207 by air cylinder 205 causes gusset plate 209, and thus pivot bar 188, to rotate around the axis of rotation of pivot bar 188. When plunger 207 is in its retracted position, movable bank 26 is rotated to its up position. When plunger 207 is extended, movable bank 26 is rotated to its down position.

Jamb locator 194 is fixedly attached to and extends between angle sections 226 and 228 (see FIG. 1). Jamb locator 194 has a flat interior surface.

Stapling unit assemblies 196, clamping assemblies 198, combined stapling and clamping assemblies 213, air cylinder support plate 200, upper air cylinder assembly 202, lower air cylinder assembly 204 and trim guide pole 215 are the same as stapling unit assemblies 130, clamping assemblies 132, combined stapling and clamping assemblies 149, air cylinder support plate 136, upper air cylinder assembly 138, lower air cylinder assembly 140, and trim guide pole 141, respectively, and thus are not illustrated or described in detail herein.

HEAD BANK OF STAPLING UNITS

Head bank of stapling units 28 includes pivot bar bearing assemblies 232 and 234, pivot bar 236, secondary pivot bar assemblies 229 and 230, stationary stapling unit assemblies 233 and 235, movable stapling unit assembly 238, linear stapling unit drive assembly 240, clamping assemblies 242 and 244, ejection air cylinder assemblies 243 and 245, trim guide assembly 247 and air cylinder assembly 249 (see FIGS. 1, 17-24 and 34).

Pivot bar bearing assembly 232 is attached to the top of beam extension 95 (see FIG. 24) and pivot bar bearing assembly 234 is attached to the top of beam extension 110 of support frame assembly 22 (see FIG. 1).

Pivot bar 236 extends between and is connected on its ends to pivot bar bearing assemblies 232 and 234. Pivot bar 236 has a square outer cross section along its entire length, except for its end portions which are cylindrical. The cylindrical end portions are rotatably received within pivot bar bearing assemblies 232 and 234. Pivot bar 236 is rotated by air cylinder assembly 249, as discussed below.

Secondary pivot bar assemblies 229 and 230 each include plate 268, support blocks 270, pivot bar bearing assemblies 272 and 274 and secondary pivot bar 276 (see FIGS. 17-21).

Plate 268 of secondary pivot bar assembly 229 is attached to the bottom of head bank support beam 76 of support frame assembly 22 and extends inwardly therefrom. Plate 268 of secondary pivot bar assembly 230 is attached to the bottom of lateral member 210 of slidable frame assembly 182 and extends inwardly therefrom. Plates 268 are oriented substantially horizontal.

Support blocks 270 are attached to the top of plates 268, with a pair of support blocks 270 on each plate 268. Each pair is spaced apart. A pivot bar bearing assembly 272 is attached to the top of one support block 270 of each pair and a pivot bar bearing assembly 274 is attached to the top of the other support block 270 of each pair. Secondary pivot bar 276 extends between and is rotatably received in pivot bar bearing assemblies 272 and 274.

Figure 18:
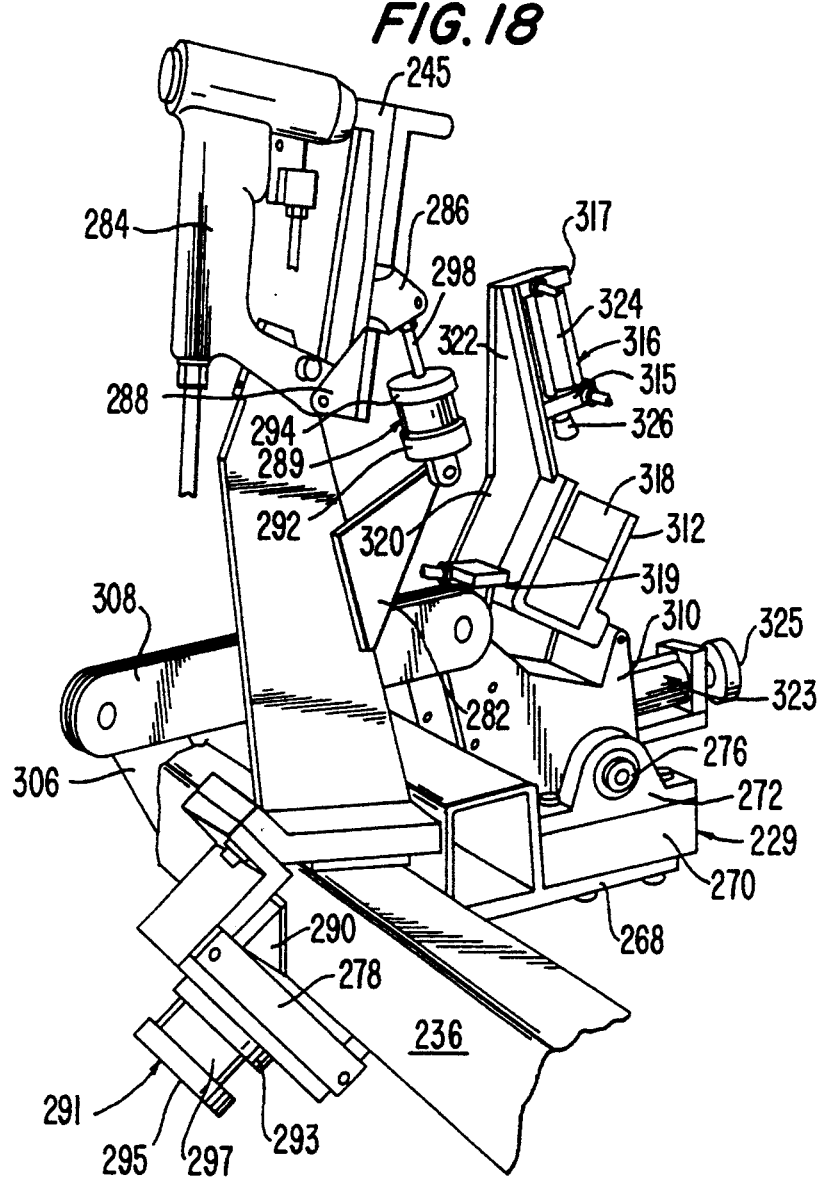
FIG. 18 is a perspective view of the clamping assembly illustrated in FIG. 17 and of an embodiment of the movable stapling unit of the head bank of the embodiment of this invention illustrated in FIG. 1.
Figure 23:
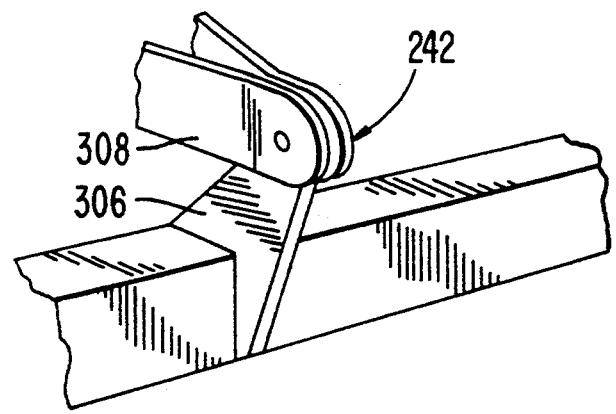
FIG. 23 is a rear perspective view of the stationary stapling unit assembly illustrated in FIG. 22, an embodiment of the right side clamping assembly and an embodiment of the movable stapling assembly of the head bank of stapling units of the embodiment of this invention illustrated in FIG. 1.

Clamping assembly 242 includes gusset plate 306, arms 308, bracket 310, channel bracket 312, L-shaped bracket 314, air cylinder assembly 316, protective material 318 and air cylinder assembly 319 (see FIGS. 17, 18 and 23).

Gusset plate 306 is fixedly attached to and extends outwardly from pivot bar 236. Arms 308 are elongated, spaced plates which are rotatably attached to gusset plate 306 at one end and to bracket 310 at the other end.

Bracket 310 is generally of a "U" shape. Bracket 310 is fixedly attached to secondary pivot bar 276 near the bottom of the "U". Arms 308 are rotatably attached to one arm of the "U" and one corner of channel bracket 312 is rotatably attached to the other arm of the "U" formed by bracket 310. Protective material 318 is provided in the interior of channel bracket 312 and is readily removable so that different sizes of protective material can be inserted in channel bracket 312, as desired.

L-shaped bracket 314 has arms 320 and 322. Arm 320 is attached to the top flange of channel bracket 312. Air cylinder assembly 316 is attached to arm 322, as discussed below.

Air cylinder assembly 316 includes end walls 315 and 317, air cylinder 324, plunger 326 and plate 329. Plate 329 is attached to the edge of arm 322 of L-shaped bracket 314, perpendicular to arm 322. End walls 315 and 317 are affixed to plate 329, on edge and in parallel. Air cylinder 324 is positioned between and supported by end walls 315 and 317. Plunger 326 extends out from and is driven by air cylinder 324. Plunger 326 extends through end wall 315 and, when extended, is designed to hold casing in abutment with a door frame assembly, as discussed below.

Air cylinder assembly 319 includes air cylinder 321, plunger 327 and end walls 337 and 339. End walls 337 and 339 are fixed in parallel. Air cylinder 321 is positioned between and supported by end walls 337 and 339. Plunger 327 is driven by air cylinder 321 and extends from air cylinder 321 through end wall 339. End wall 337 is rotatably attached to bracket 310, proximate the connection of arms 308 to bracket 310, by pin 333. The free end of plunger 327 is rotatably attached to arm 320 of L-shaped bracket 314.

Figure 21:
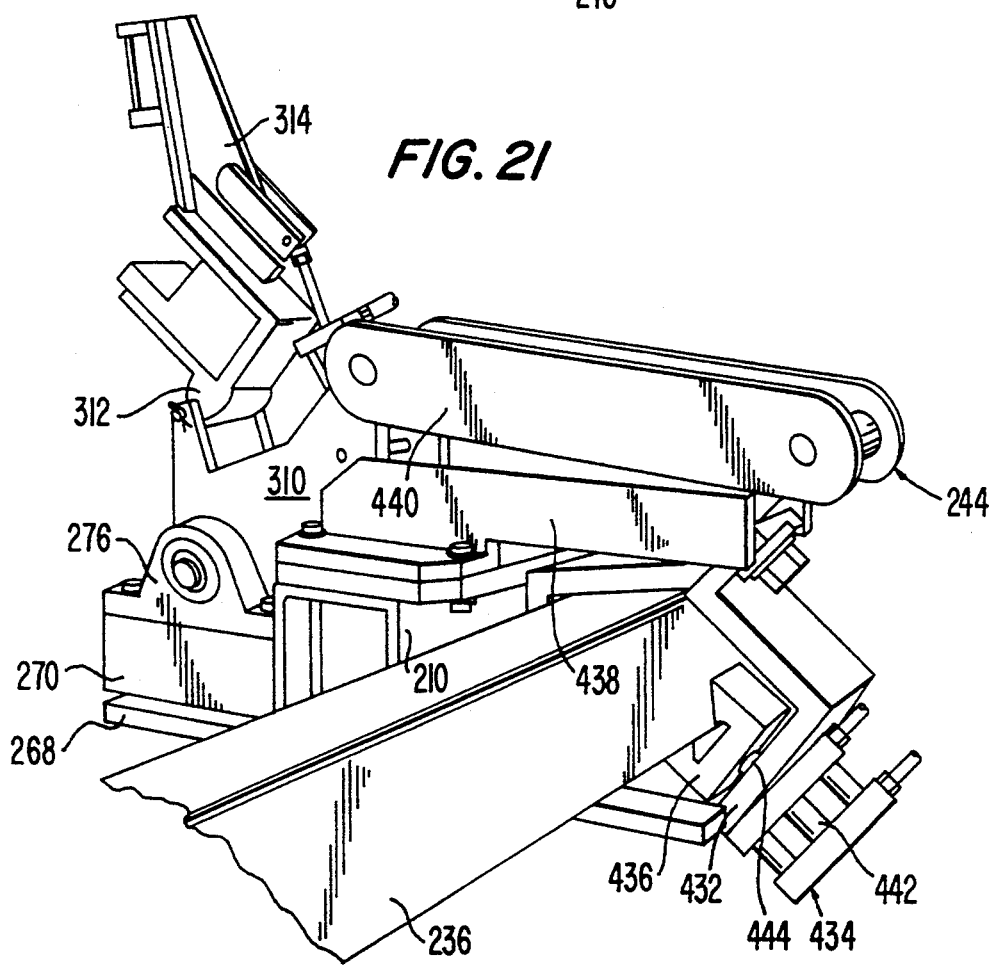
FIG. 21 is a side perspective view of the clamping assembly illustrated in FIGS. 19 and 20.

The extension and retraction of plunger 327 causes channel bracket 312, L-shaped bracket 314 and air cylinder assembly 316 to rotate around the axis of rotation of channel bracket 312 (see FIG. 21). When plunger 327 is retracted, channel bracket 312, L-shaped bracket 314 and air cylinder assembly 316 are in their up position. When plunger 327 is extended, channel bracket 312, L-shaped bracket 314 and air cylinder 316 are rotated to their down position.

Clamping assembly 244 includes bracket 310, channel bracket 312, L-shaped bracket 314, air cylinder assembly 316, protective material 318 and air cylinder assembly 319 (see FIGS. 19 and 21), the same as clamping assembly 242, but does not include gusset plate 306 and arms 308. Gusset plate 306 and arms 308 are essentially replaced by collar 432, air cylinder assembly 434, sliding blocks 436, arms 438 and arms 440.

Collar 432 encompasses pivot bar 236. Sliding blocks 436 are positioned and retained between collar 432 and pivot bar 236.

Air cylinder assembly 434 is attached to the exterior of collar 432 and includes air cylinder 442 and plunger 444. Plunger 444 is driven by air cylinder 442 and extends out of air cylinder 442, through collar 432. The free end of plunger 444 is in abutment with sliding blocks 436. When plunger 444 is extended, it pushes sliding blocks 436 firmly against pivot bar 236 such that sliding blocks 436 and the entire clamping assembly 244 cannot slide relative pivot bar 236. When plunger 444 is retracted, clamping assembly 244 can slide relative pivot bar 236.

Arms 438 are elongated, spaced plates which extend between and are connected at their ends to top lateral member 210 of slidable frame assembly 182 and collar 432, such that collar 432, and thus clamping assembly 244, moves with slidable frame assembly 182. Arms 440 are elongated, spaced plates which extend between and are rotatably connected on their ends to collar 432 and bracket 310.

Figure 20:
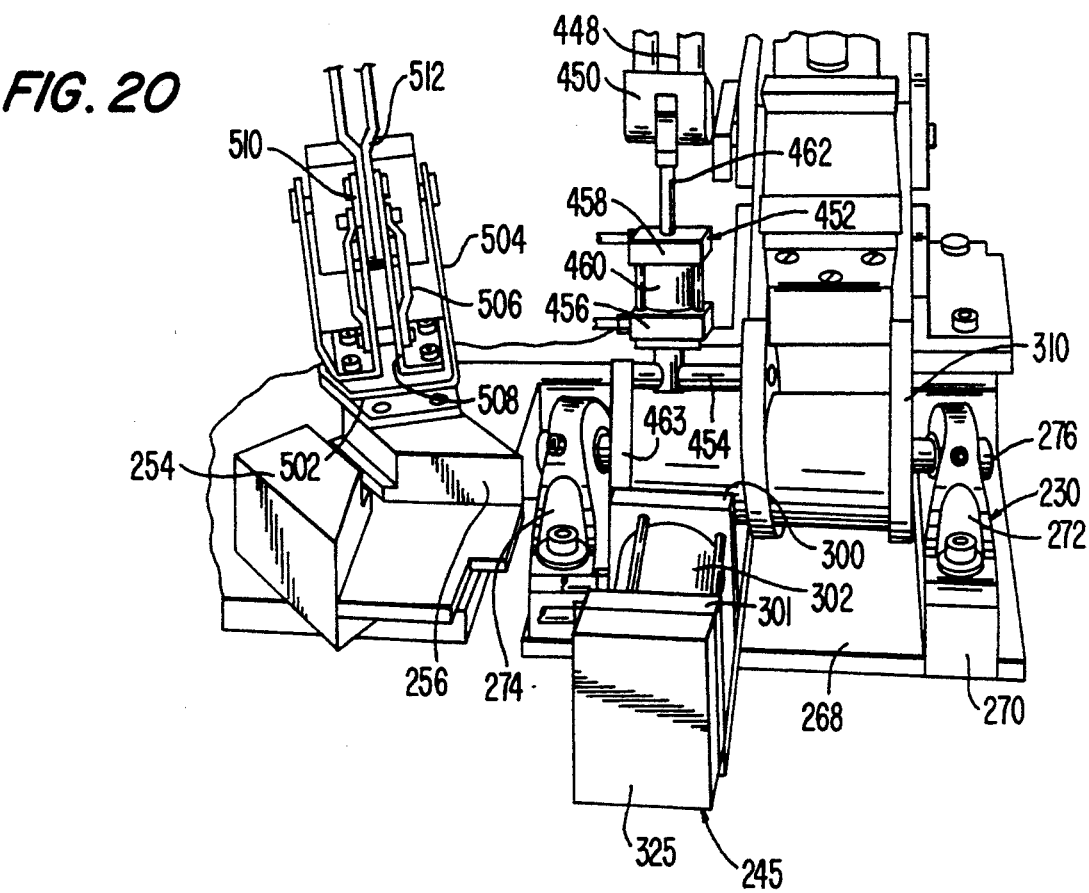
FIG. 20 is a front perspective view of the clamping assembly illustrated in FIG. 19, an embodiment of the stationary stapling unit assembly and an embodiment of the corner splicing assembly of the embodiment of this invention illustrated in FIG. 1.
Figure 22:
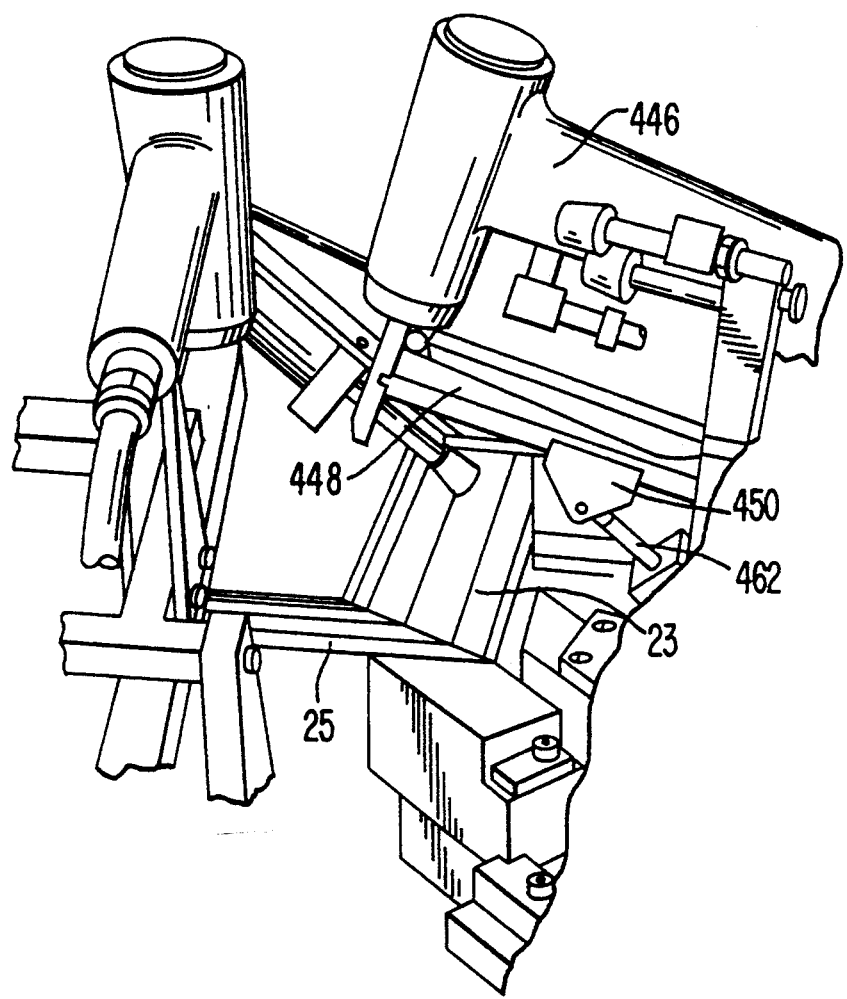
FIG. 22 is a perspective view of an embodiment of the stationary stapling assemblies of the head bank of stapling units of the embodiment of this invention illustrated in FIG. 1.

Stationary stapling unit assemblies 233 and 235 each include stapler 446, magazine 448, bracket 450, air cylinder assembly 452 and gusset plate 463 (see FIGS. 20 and 22). Stapler 446 is rotatably attached to arms 308. Magazine 448 extends from the anvil of stapler 446 backward under stapler 446. Magazine 448 supplies staples to stapler 446. Staplers and magazines, such as stapler 446 and magazine 448 are well known in this industry, and thus stapler 446 and magazine 448 are not described in detail herein.

Bracket 450 is attached to the underside of magazine 448 and extends downwardly therefrom. Gusset plate 463 is attached to secondary pivot bar 276 and extends outwardly therefrom, parallel to the outer wall of bracket 310.

Air cylinder assembly 452 includes pivot pin 454, end walls 456 and 458, air cylinder 460 and plunger 462. Pivot pin 454 extends between one side wall of bracket 310 and gusset plate 463. End wall 456 is rotatably attached to pivot pin 454. End walls 456 and 458 are affixed in parallel. Air cylinder 460 is received between and supported by end walls 456 and 458. Plunger 462 is driven by air cylinder 460 and extends outwardly therefrom, through end wall 458. The free end of plunger 462 is rotatably attached to bracket 450. The extension and retraction of plunger 462 causes stapler 446 to rotate about the connection of stapler 446 to arms 308 (see FIG. 22). When plunger 462 is retracted, stapler 446 is in its down position. When plunger 462 is extended, stapler 446 is rotated to its up position.

Figure 34:
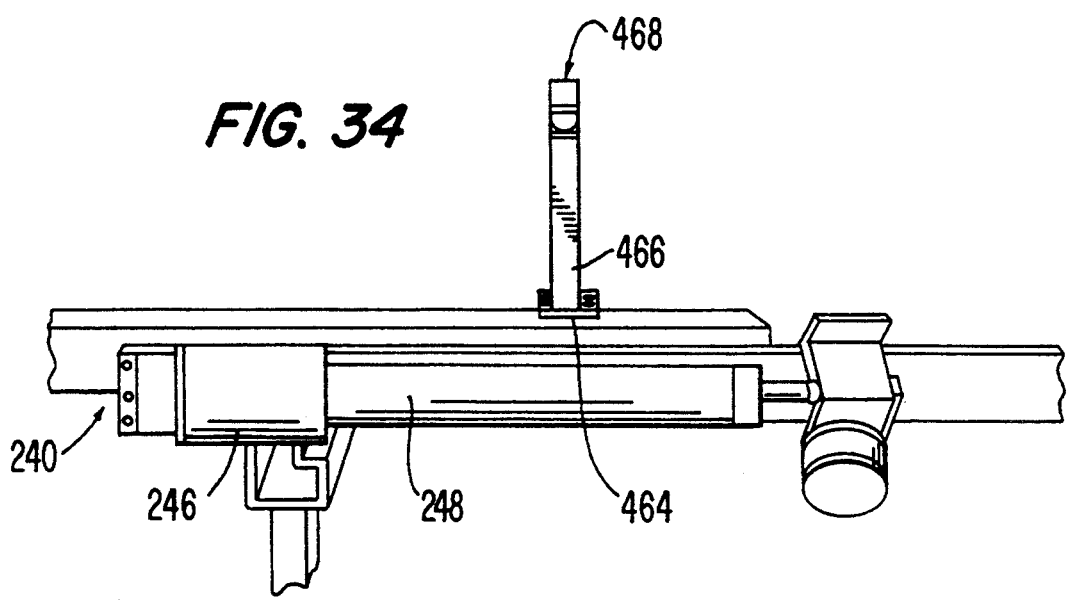
FIG. 34 is a partial rear perspective view of the head bank of stapling units of the embodiment of this invention illustrated in FIG. 1.

Movable stapling unit assembly 238 includes collar assembly 278, slide blocks 290, arm 280, secondary arm 282, stapler 284, bracket 286, magazine 288, air cylinder assembly 289 and air cylinder assembly 291 (see FIGS. 18 and 34).

Collar assembly 278 encompasses pivot bar 236. Slide blocks 290 are positioned and retained between collar assembly 278 and pivot bar 236.

Arm 280 is an elongated arm which is attached on one end to collar assembly 278 and extends outward therefrom. Stapler 284 is rotatably attached to the other end of arm 280. Stapler 284 includes anvil 285. Magazine 288 extends between anvil 285 and the connection of stapler 284 to arm 280 and automatically supplies staples to stapler 284. Staplers and magazines, such as stapler 284 and magazine 288, are well known in this industry and thus are not described in detail herein.

Bracket 286 is attached to the underside of magazine 288. Secondary arm 282 is fixedly attached to arm 280 on one end, about halfway between the ends of arm 280, and extends inward therefrom.

Air cylinder assembly 289 includes end walls 292 and 294, air cylinder 296 and plunger 298. End walls 292 and 294 are affixed in parallel. Air cylinder 296 is positioned between and supported by end walls 292 and 294. Plunger 298 is driven by air cylinder 296 and extends therefrom, through end wall 294. End wall 292 is rotatably attached to the outer end of secondary arm 282. The free end of plunger 298 is rotatably attached to bracket 286. The extension and retraction of plunger 298 causes stapler 284 to rotate about the axis of rotation between stapler 284 and arm 280. When plunger 298 is retracted, stapler 284 is in its down position. When plunger 298 is extended, stapler 284 is in its up position.

Air cylinder assembly 291 includes end plates 293 and 295, air cylinder 297 and a plunger (not shown). End plate 293 is attached to collar assembly 278. End plate 295 is fixedly spaced from end plate 293, in parallel. Air cylinder 297 is positioned between and supported by end plates 293 and 295. The plunger is driven by and extends out of air cylinder 297 through end plate 293. The free end of the plunger is in abutment with sliding block 298. When the plunger is fully extended, the plunger presses sliding block 298 into firm engagement with pivot bar 236, preventing the movement of movable stapling unit assembly 238 along pivot bar 236. When the plunger is retracted, sliding block 298, and thus the entire movable stapling unit assembly 238, is free to move along pivot bar 236.

Linear staple unit drive assembly 240 includes linear motor 246 and retractable and extendable plunger 248 (see FIG. 34). Linear motor 246 is attached to one end of pivot bar 236. Plunger 248 is driven by linear motor 246 and extends out therefrom, parallel to pivot bar 236. The free end of plunger 248 is affixed to collar assembly 278 of movable stapling unit assembly 238.

Linear motor drive 246 is employed to move stapling unit assembly 238 along pivot bar 236. Linear motor drive 246 and stapling unit assembly 238 are controlled by programmable controller 38 (discussed below) such that, once it is ready to proceed with attachment of a piece of head casing to the head jamb of a structural frame assembly, stapling unit assembly 238 is driven along pivot bar 236 by linear motor drive 246, stopped at selected intervals and injects staples at selected intervals, as discussed below.

Ejection air cylinder assemblies 243 and 245 each include base plate 331, air cylinder assembly 323 and plunger 325 (see FIGS. 17-20). Base plate 331 is attached to plate 268 and is oriented horizontally.

Air cylinder assembly 323 includes end walls 300 and 301, air cylinder 302 and plunger 325. End walls 300 and 301 are attached, on edge and in parallel, to base plate 331. Air cylinder 302 is positioned between and supported by end walls 300 and 301. Plunger 325 is driven by air cylinder 323 and extends outwardly therefrom, through end wall 301. Plungers 325, when retracted, are designed to engage door frame assembly 21 when door frame assembly 21 is positioned in casing attachment machine 20, and function as a reference point for the head of door frame assembly 21. When plungers 325 are extended, they push door frame assembly 21 away from head bank of stapling units 28, as described below.

Trim guide assembly 247 includes base plate 464, pole 466 and air cylinder assembly 468 (see FIGS. 17 and 34). Base plate 464 is attached to the top of head bank support beam 76. Pole 466 is attached to base plate 464, on end, and extends upwardly therefrom. Air cylinder assembly 468 is attached to the top end of pole 466.

Air cylinder assembly 468 includes end walls 470 and 472, air cylinder 474 and plunger 476. End wall 470 is attached to the top of pole 466. End wall 472 is fixedly attached to end wall 470, in parallel. Air cylinder 474 is positioned between and supported by end walls 470 and 472. Plunger 476 is driven by air cylinder 474 and extends outwardly therefrom, through end wall 470 and pole 466.

When plunger 476 is extended, its free end is in line with head casing 23 placed in channel brackets 312 of clamping assemblies 242 and 244 when clamping assemblies 242 and 244 are in the up position. Thus, plunger 476 functions as a guide for head casing 23 when head casing 23 is placed in clamping assemblies 242 and 244.

Figure 24:
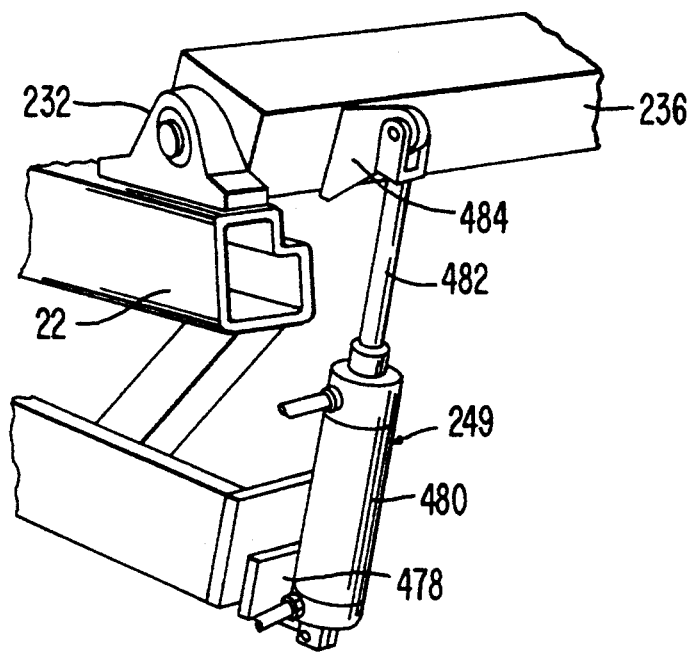
FIG. 24 is a partial rear perspective view of the head bank of the embodiment of this invention illustrated in FIG. 1, illustrating the air cylinder assembly which rotates the pivot bar of the head bank.
Figure 25:
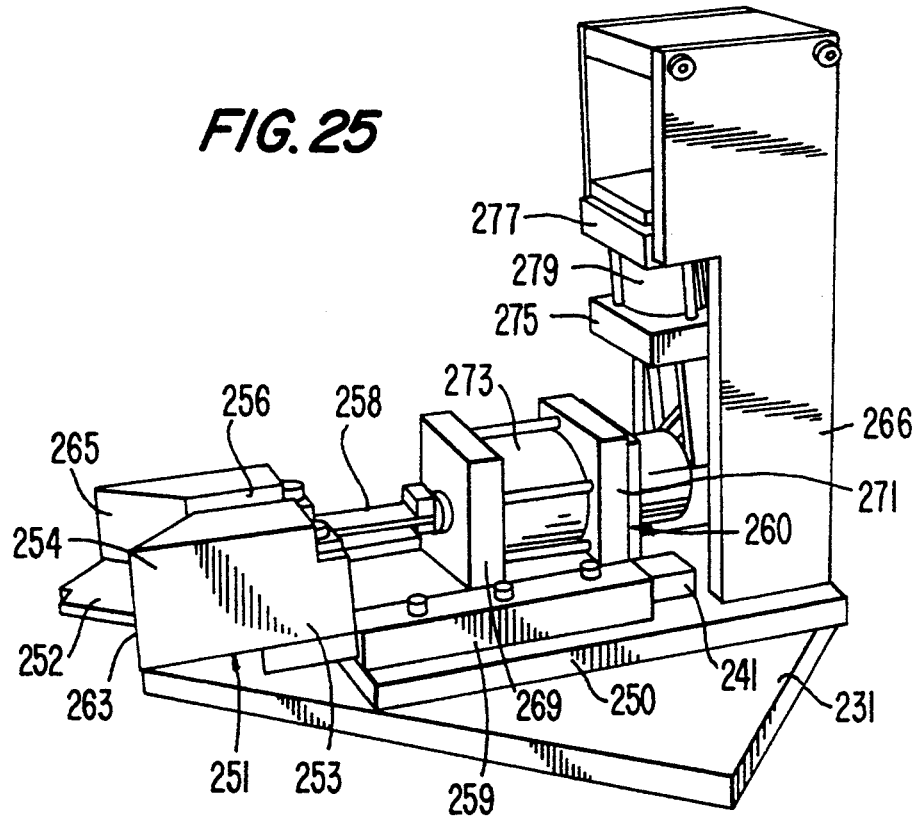
FIG. 25 is a side perspective view of an embodiment of the corner splicing assemblies of the embodiment of this invention illustrated in FIG. 1.

Air cylinder assembly 249 includes base plate 478, air cylinder 480, plunger 482 and gusset plate 484 (see FIG. 24). Plunger 482 extends out one end of air cylinder 480 and is driven by air cylinder 480.

Base plate 478 is attached to support frame assembly 22. The end of air cylinder 480 opposite plunger 482 is rotatably attached to base plate 478. Gusset plate 484 is attached to pivot bar 236. The free end of plunger 482 is rotatably attached to gusset plate 484. The extension and retraction of plunger 482 causes pivot bar 236, and thus head bank 28, to rotate about the axis of rotation of pivot bar 236. When plunger 482 is retracted, head bank 28 is in its up position. When plunger 482 is extended, head bank 28 is rotated to its down position.

CORNER SPLICING ASSEMBLIES

Corner splicing assembly 30 is attached to and supported by top lateral member 210 of slidable frame assembly 182. Corner splicing assembly 32 is attached to and supported by head bank support beam 76.

Corner splicing assemblies 30 and 32 each include base support plates 231 and 250, head assembly 251, side guide bars 259, linkage 262, upright air cylinder assembly 264, upright support plates 266, top cross plate 257 and clamping assembly 267 (see FIGS. 25-30).

Base support plate 231 of corner splicing assembly 30 is attached to the top of top lateral member 210 and base support plate 231 of corner splicing assembly 32 is attached to the top of head bank support beam 76. Base support plate 250 is attached to the top of base support plate 231. Base support plates 231 and 250 are oriented horizontally.

Side guide bars 259 are angles attached to base support plate 250 in a spaced, parallel relationship. Side guide bars 259 have one flange of the angle attached to base support plate 250, on edge. The other flange is parallel to base support plate 250, spaced above base plate 250. The "interior" of the angles face one another.

Head assembly 251 includes base plate 241, casing support plate 252, base 253, spline guides 254 and 256 and air cylinder assembly 260. Head assembly 251 is slidably supported by base support plate 250 and side guide bars 259 and is slidably driven by air cylinder assembly 264, as discussed below.

Figure 29:
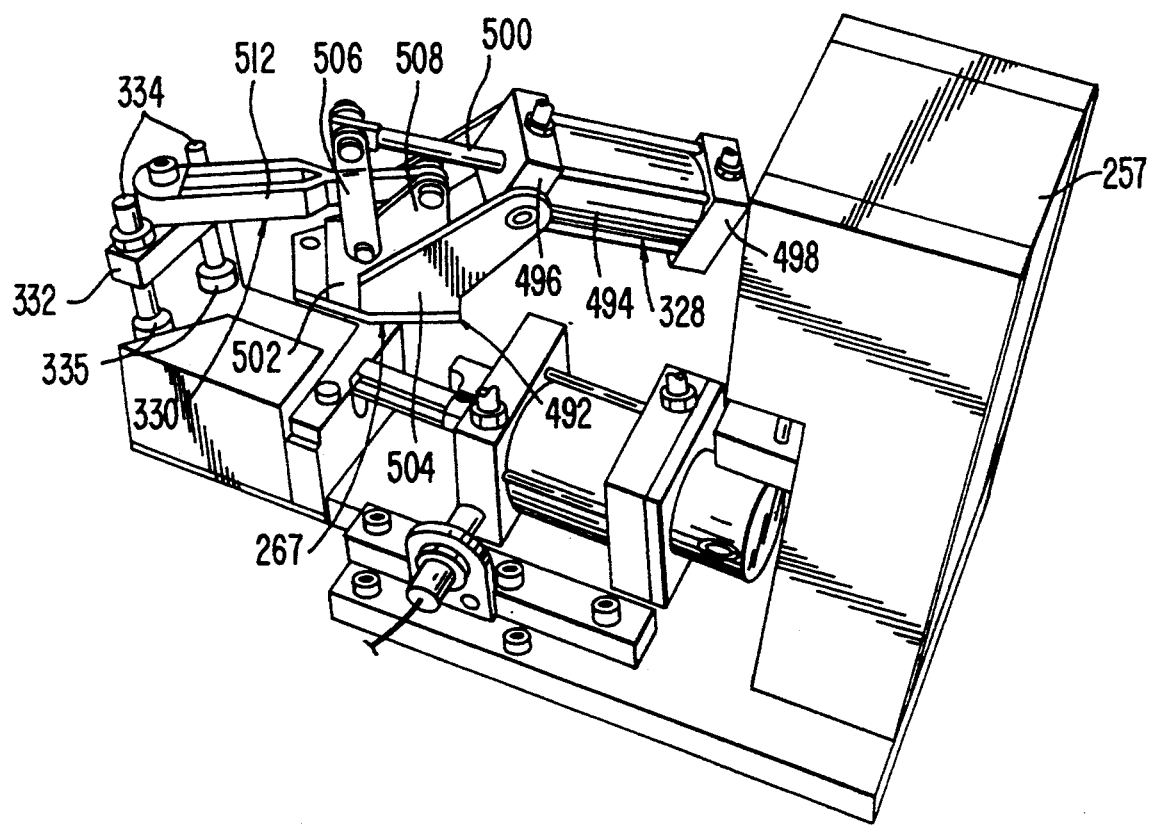
FIG. 29 is a top perspective view of the embodiment of the corner splicing assembly illustrated in FIGS. 25–28, illustrating clamping assembly in the down position.

Base plate 241 is slidably received on base support plate 250 between the lower flanges of side guide bars 259 (see FIG. 29). The upper flanges of side guide bars 259 overlap the longitudinal edges of base plate 241 to partially retain base plate 241 between guides bars 259. Base 253 and air cylinder assembly 260 are attached to the top of base plate 241.

Figure 26:
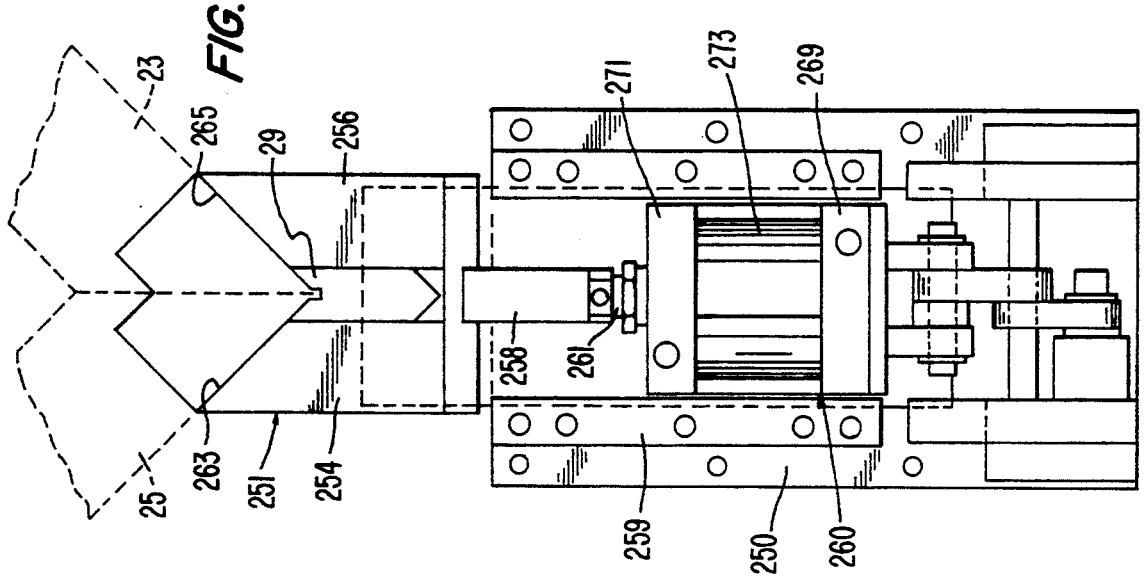
FIG. 26 is a partial top view of the embodiment of the corner splicing assembly illustrated in FIG. 25.

Casing support plate 252 is a flat plate which extends horizontally out the front of base 253 and is designed to receive edges of casing 25 and 27, as discussed below. Spline guides 254 and 256 extend upward from base 253 and have a polygonal cross-sectional shape forming front surfaces 263 and 265, respectively, as illustrated in FIG. 26. Front surfaces 263 and 265 form the sides of a ninety degree corner. Spline guides 254 and 256 are spaced apart such that a channel is formed between them. Casing support plate 252, base 253 and spline guides 254 and 256 can be an integral member or can be a series of connected pieces.

Air cylinder assembly 260 includes end walls 269 and 271, air cylinder 273, plunger 261 and driver 258. End walls 269 and 271 are attached to the top of base plate 241, on edge and in parallel. Air cylinder 273 is positioned between and supported by end walls 269 and 271.

Plunger 261 is driven by air cylinder 273 and extends out one end thereof through end wall 269.

Driver 258 is attached to the free end of plunger 261. Driver 258 is a flat plate slidably received in the channel formed between spline guides 254 and 256. Driver 258 is designed to be reciprocated in the channel formed between spline guides 254 and 256 to drive splines into the corner of the casing retained on casing support plate 252 as discussed below. The extension and retraction of plunger 261 slides driver 258 between spline guides 254 and 256 (see FIG. 27).

Upright support plates 266 are attached to base support plate 250 on edge, in parallel. Top cross plate 257 extends between and is attached to the top of upright support plates 266 to form a closed frame.

Upright air cylinder assembly 264 includes end walls 275 and 277, air cylinder 279 and plunger 281. End walls 275 and 277 extend between and are attached to upright support plates 266, in parallel. Air cylinder 279 is positioned between and supported by end walls 275 and 277. Plunger 281 is driven by air cylinder 279 and extends out one end of air cylinder 279, through end wall 275.

Figure 27:
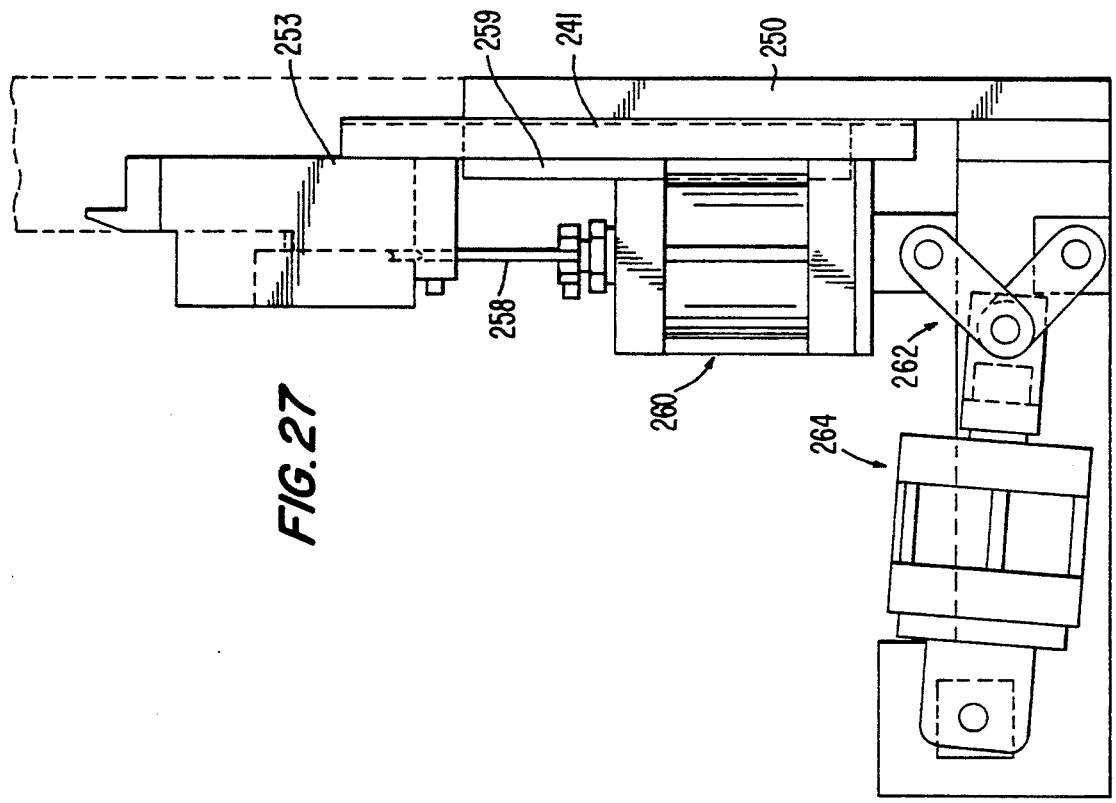
FIG. 27 is a partial side views of the embodiment of the corner splicing assembly illustrated in FIGS. 25 and 26, illustrating the corner splicing assembly in the retracted position.

Linkage 262 includes links 486 and 488 and base 490 (see FIG. 27). Base 490 is attached to one of upright support plates 266. One end of link 486 is rotatably attached to base 490 and the other end is rotatably attached to the free end of plunger 281. One end of link 488 is rotatably attached to the free end of plunger 281 and the other end is rotatably attached to end wall 271 of air cylinder assembly 260. The extension and retraction of plunger 281 causes the angle formed by links 486 and 488 to expand and contract (see FIG. 27). Since link 488 is attached to air cylinder assembly 260 which is in turn attached to base plate 241, extension and retraction of plunger 281 causes head assembly 251 to slide relative base support plate 250. When plunger 281 is retracted, head assembly 251 is in its retracted position. When plunger 281 is extended, head assembly 251 is in its outward position.

Figure 30:
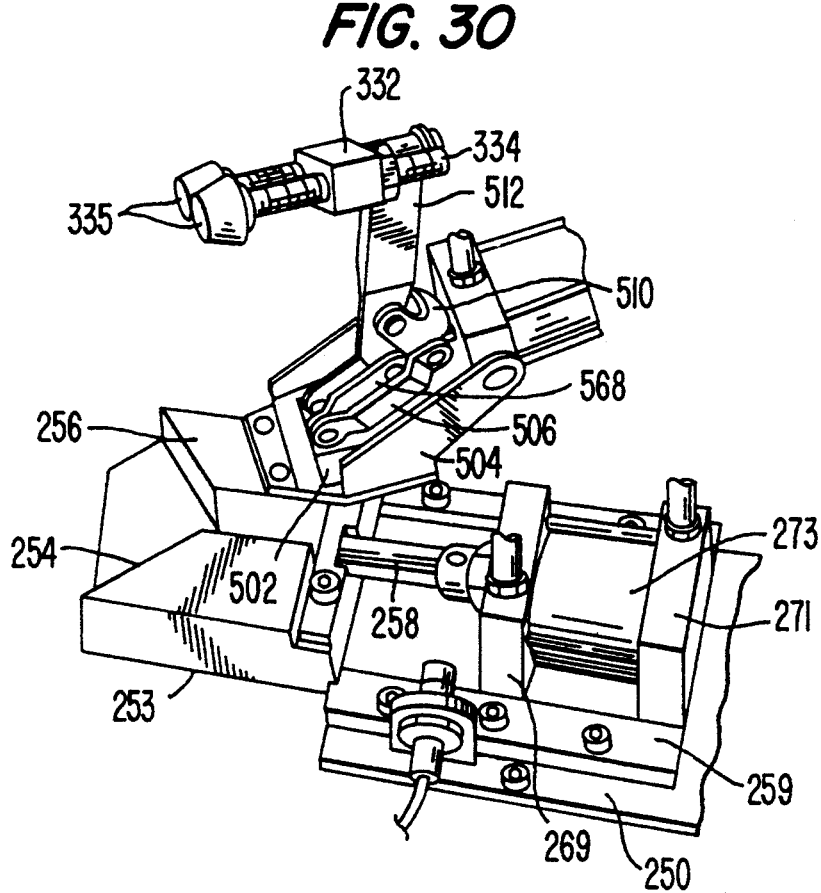
FIG. 30 is a top perspective view of the embodiment of the corner splicing assembly illustrated in FIGS. 25–29, illustrating the clamping assembly in the up position.

Corner clamping assembly 267 includes air cylinder assembly 328 and clamp assembly 330 (see FIGS. 20, 29 and 30).

Air cylinder assembly 328 includes base bracket 492, air cylinder 494, end walls 496 and 498 and plunger 500. Base bracket 492 includes web 502 and flanges 504. Web 502 abuts and is attached to spline guide 256 of corner splicing assembly 32. In corner splicing assembly 30, web 502 is attached to spline guide 254. Flanges 504 extend vertically from web 502, in parallel. End wall 496 extends between and is attached to the top ends of flanges 504. End wall 498 is fixedly attached to end wall 496, in parallel. Air cylinder 494 is positioned between and supported by end walls 496 and 498. Plunger 500 is driven by air cylinder 494 and extends out of one end of air cylinder 494, through end wall 496.

Clamp assembly 330 includes links 506, bracket 508, bracket 510, arm 512, cross bar 332, threaded shafts 334 and rubber stops 335.

Bracket 508 is fixedly attached to web 502 and extends upward therefrom, between flanges 504. In this embodiment, bracket 508 includes a pair of parallel, triangular plates, oriented vertically.

Links 506 are rotatably attached, on one end, to bracket 508 at one lower corner thereof. Links 506 are a pair of links, one located on each side of bracket 508. The other end of links 506 is rotatably attached to the free end of plunger 500 of air cylinder assembly 328.

Bracket 510 is in the shape of a "U", with arm 512 being received within the "U". Bracket 510 is rotatably attached to the free end of plunger 500 and also is rotatably attached to arm 512, immediate the ends of arm 512.

One end of arm 512 is rotatably attached to bracket 508 near the apex of bracket 508. Cross bar 332 is fixedly attached to the other end of arm 512. Shafts 334 extend through cross bar 332 and threadedly engage cross bar 332 so that the length of shafts 334 on the front side of cross bar 332 can be varied. Rubber stops 335 are attached on the front ends of shafts 334.

The retraction and extension of plunger 500 causes links 506 to rotate relative bracket 508 and bracket 510 to rotate about the connection of bracket 510 to plunger 500 (see FIGS. 29 and 30). This action causes arm 512 to rotate about its connection with bracket 508. Since cross bar 332 is attached to one end of arm 512, cross bar 332 and shafts 334 rotate in an arc having the connection of arm 512 to bracket 508 as the center of the arc. When plunger 500 is retracted, clamp assembly 330 is in its up position. When plunger 500 is extended, clamp assembly is rotated to its down position and rubber stops 335 are pressed against casing received on casing support plate 252.

LIFTING ASSEMBLY

Figure 31:
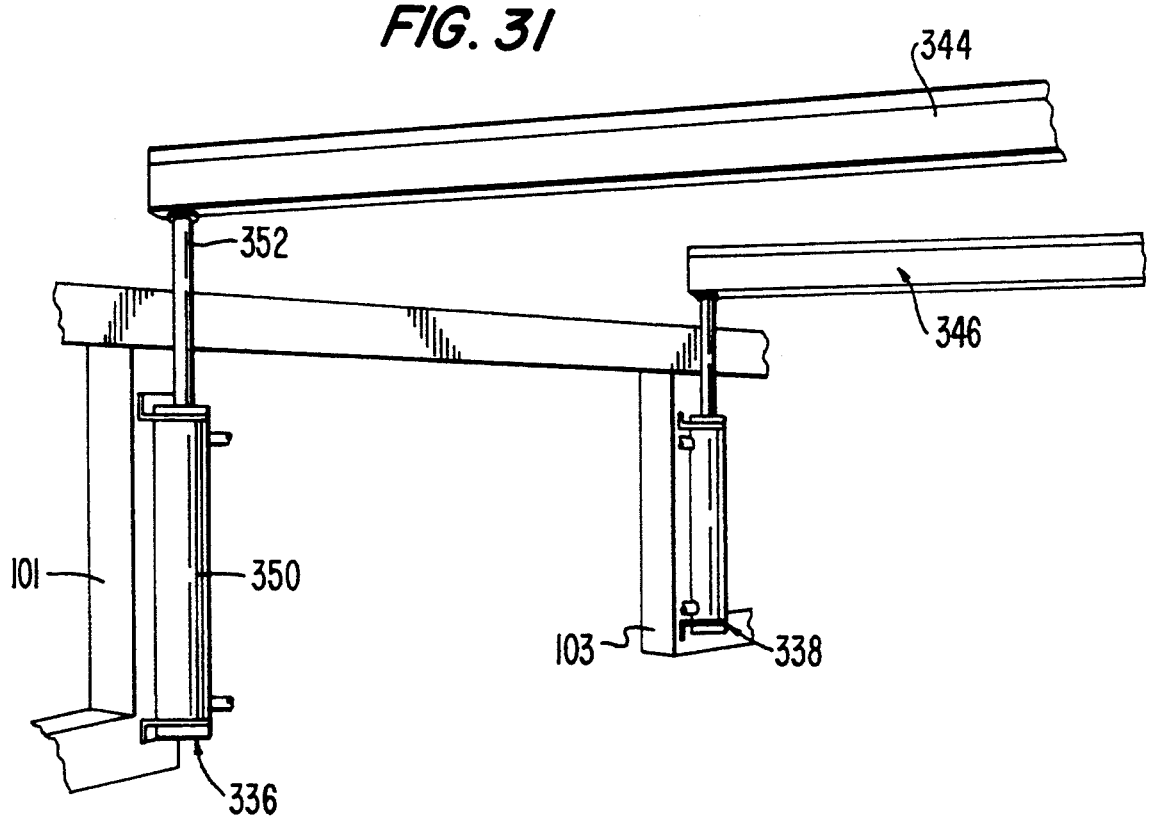
FIG. 31 is a partial perspective view of an embodiment of the assembly for lifting and lowering a structural frame assembly of the embodiment of this invention illustrated in FIG. 1.

Lifting assembly 34 includes air cylinder assemblies 336, 338, 340 and 342 and cross beam assemblies 344 and 346 (see FIGS. 2, 31 and 32).

Each air cylinder assembly 336, 338, 340 and 342 includes air cylinder 350 and extendable and retractable plunger 352. Air cylinder assemblies 336, 338, 340 and 342 are attached to the vertical arms of L-shaped members 101, 103, 102 and 100, respectively, of bottom support frame assembly 22, such that air cylinders 350 are oriented vertically. Extendable and retractable arms 352 are driven by air cylinders 350 and extend out the top end of air cylinders 350.

Cross beam assembly 344 is supported on its ends by the free ends of plungers 352 of air cylinder assembly 336 and air cylinder assembly 340. Cross beam assembly 346 is supported at its ends by the free ends of plungers 352 of air cylinder assembly 338 and air cylinder assembly 342.

The operation of air cylinder assemblies 336, 338, 340 and 342 controls the raising and lowering of cross beam assemblies 344 and 346. When plungers 352 are retracted, cross beam assemblies 344 and 346 are in their lowered position. When plungers 352 are extended, cross beam assemblies 344 and 346 are in their raised position.

Cross beam assemblies 344 and 346 each include beam 341, a plurality of protractable support squares 345 and air cylinder assemblies 347. Beam 341 is an elongated beam. Protractable support squares 345 are spaced serially along the approximate left half of beam 341. Air cylinder assemblies 347 are positioned under the approximate left half of beam 341. There is an air cylinder assembly 347 for each protractable support square 345.

The air cylinder assemblies 347 function to raise and lower the protractable support squares 345 as desired, as discussed below. When the plunger of an air cylinder assembly 347 is retracted, the top surface of the corresponding support square 345 is flush with the top surface of beam 341. When a plunger of an air cylinder assembly 347 is extended, the corresponding support square 345 is pushed above the top surface of beam 341.

CONVEYOR BELT ASSEMBLY

Conveyor belt assembly 36 is a conventional conveyor belt assembly and thus is not illustrated or described in detail herein. Conveyor belt assembly 36 extends longitudinally between cross beam assemblies 344 and 346.

PROGRAMMABLE CONTROLLER

Programmable controller 38 is a programmable logic controller (PLC). Since such controllers are well known in this industry and are available from many manufacturers, controller 38 is not described or illustrated in detail herein. Programmable controller 38 is electronically connected to all of the sub-assemblies of casing support machines 20 and to all elements of the assembly line as discussed below (see FIG. 33). Programmable controller 38 functions to operate and coordinate all elements of casing attachment machine 20 and of the assembly line.

ASSEMBLY LINE

Figure 33:
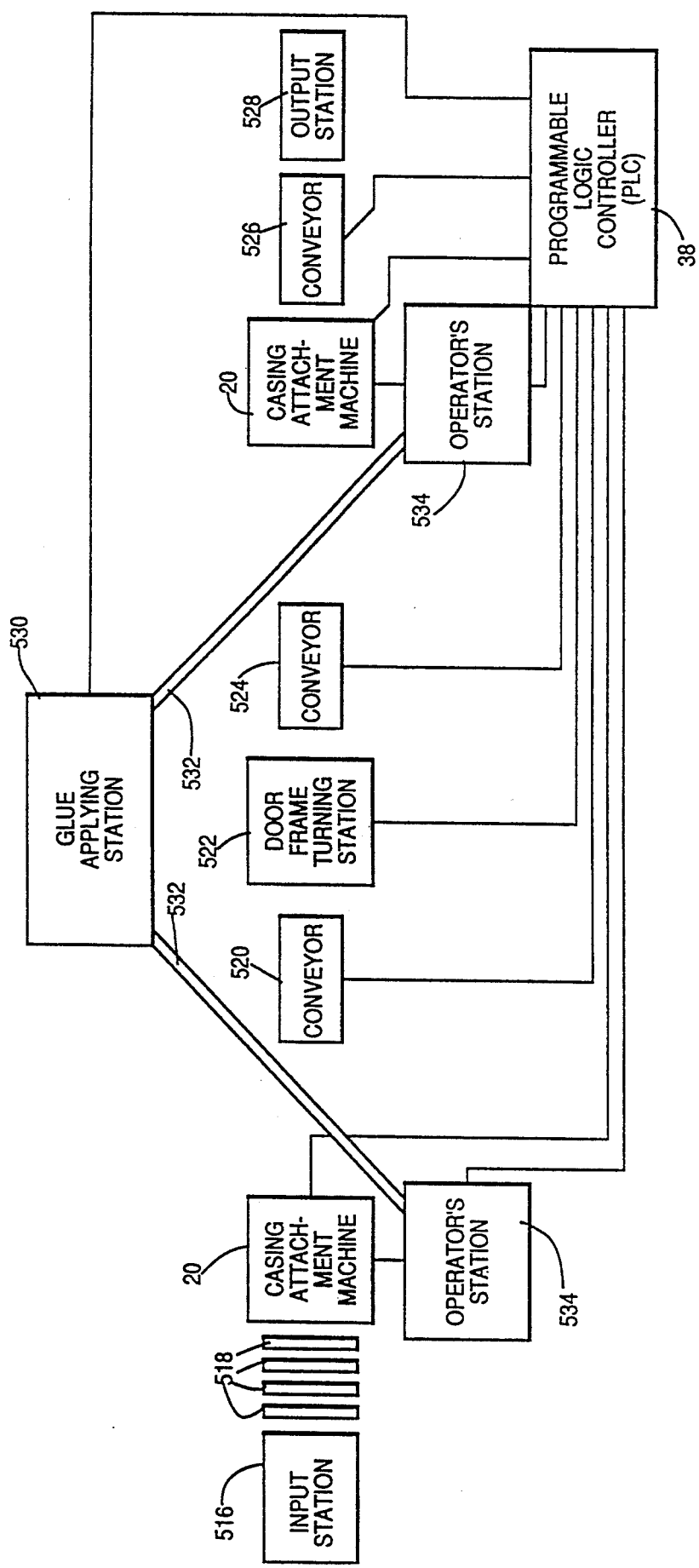
FIG. 33 is a block diagram illustrating an assembly line utilizing the embodiment of this invention illustrated in FIGS. 1–32.

Casing attachment machine 20 can be employed in a variety of manufacturing situations, varying from a single machine 20 fed door frames and casing by hand and removed by hand to a more complex semi-automatic assembly line as illustrated in FIG. 33.

The assembly line illustrated in FIG. 33 includes, in seriatim, input station 516, rollers 518, a first casing attachment machine 20, conveyor 520, door frame turning station 522, conveyor 524, a second casing attachment machine 20, conveyor 526 and output station 528. In addition, the assembly line includes glue applying station 530, chutes 532 and operator's stations 534.

Input station 516 is designed to receive a door frame assembly, without casing. Input station 516 can be as simple as a flat table, or additional guides may be provided.

Rollers 518 are idle rollers. Rollers 518 and conveyors 520, 524 and 526 are conventional in this industry and thus are not illustrated or described in detail herein.

Door frame turning station 522 is a station at which the door frame assembly, now with casing attached on one side, is manually or automatically turned 180 degrees.

Output station 528 is designed to receive a door frame, with casing on both sides, off of conveyor 526. Output station 528 can be a simple table or a more complex work station wherein follow-up functions can be performed.

Glue applying station 530 is designed to automatically apply glue to the leading edge of casing fed through glue applying station 530. Chutes 532 extend between glue applying station 530 and operator's stations 534 to transport the casing, now with glue applied on the leading edge, to the operator's stations 534.

Each operator's station 534 includes a control panel for controlling the corresponding casing attachment machine 20, as well as conveyors 520, 524 and 526 and door frame turning station 522. The control panel may also include indicator and/or warning lights or gauges.

Programmable logic controller 38 is connected to casing attachment machines 20, conveyors 520, 524 and 526, door frame turning station 522 (if automatic), glue applying station 530 and operator's stations 534 to properly sequence the operation of all of these elements.

OPERATION

Casing attachment machine 20 is designed to be used as part of an assembly line as illustrated in FIG. 33 and as discussed above.

The assembly line is employed by placing a door frame assembly, without casing, such as door frame assembly 21, on input station 516 (see FIG. 33). After door frame assembly 21 is properly positioned on input station 516, door frame assembly 21 is pushed over rollers 518 into the first casing attachment machine 20. The first casing attachment machine 20 operates to attach casing on one side of door frame assembly 21, as discussed below.

Figure 36A:
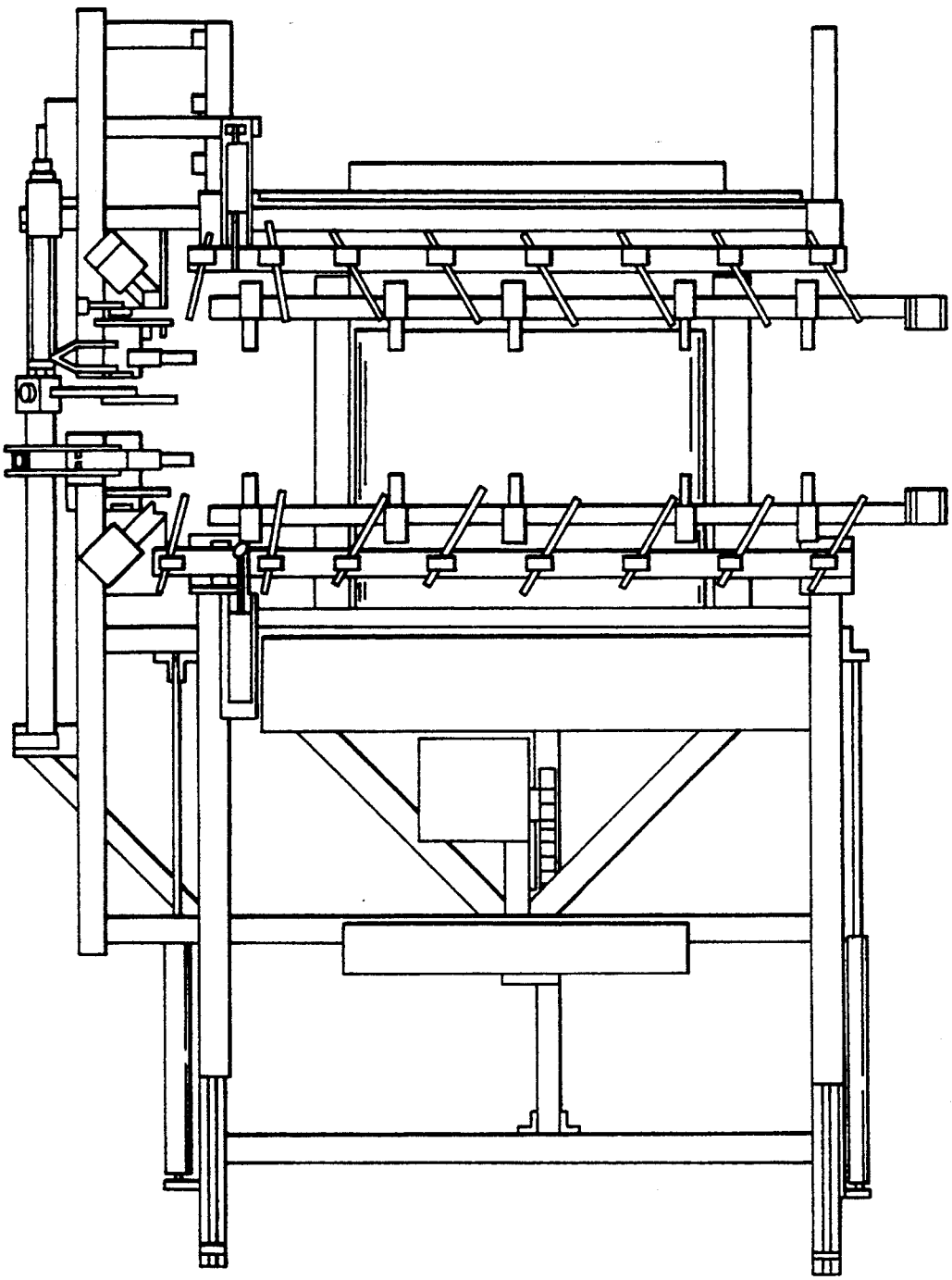

When door frame assembly 21 is to be received in the first casing attachment machine 20, i.e., when casing attachment machine 20 is in the "start" position (see FIG. 36A), plungers 252 of air cylinder assemblies 336, 338, 340 and 342 are in their lowermost or down position (see FIG. 36B). When plungers 352 are in this position, the top surfaces of cross beam assemblies 344 and 346 are just below the top surfaces of rollers 518 and of the conveyor of conveyor belt assembly 36. Thus, when the door frame assembly is pushed over rollers 518 into the first casing attachment machine 20, the door frame assembly comes to rest on the conveyor belt of conveyor belt assembly 36.

In addition, when casing attachment machine 20 is in the "start" position, plunger 191 of air cylinder assembly 183 and plunger 199 of air cylinder assembly 185 are in their extended position, positioning movable bank of stapling units 26 in its innermost position, i.e., closest to fixed bank of stapling units 24.

Further, plungers 135, 207 and 482 of air cylinder assembly 120 (of fixed bank 24), air cylinder assembly 181 (of movable bank 26) and air cylinder assembly 249 (of head bank 28), respectively, are in their retracted positions (see FIGS. 4, 15, 24 and 36A). This retains pivot bars 128, 188 and 236 of fixed bank of stapling units 24, movable bank of stapling units 26 and head bank of stapling units 28, respectively, such that 1) stapling units 130, clamping assemblies 132 and combined stapling and clamping units 149 of fixed bank of stapling units 24, 2) stapling units 196, clamping assemblies 198 and combined stapling and clamping units 213 of movable bank of stapling units 26 and 3) stapling units 233, 235 and 238 and clamping assemblies 242 and 244 of head bank of stapling units 28 are in their raised or up positions.

Figure 5:
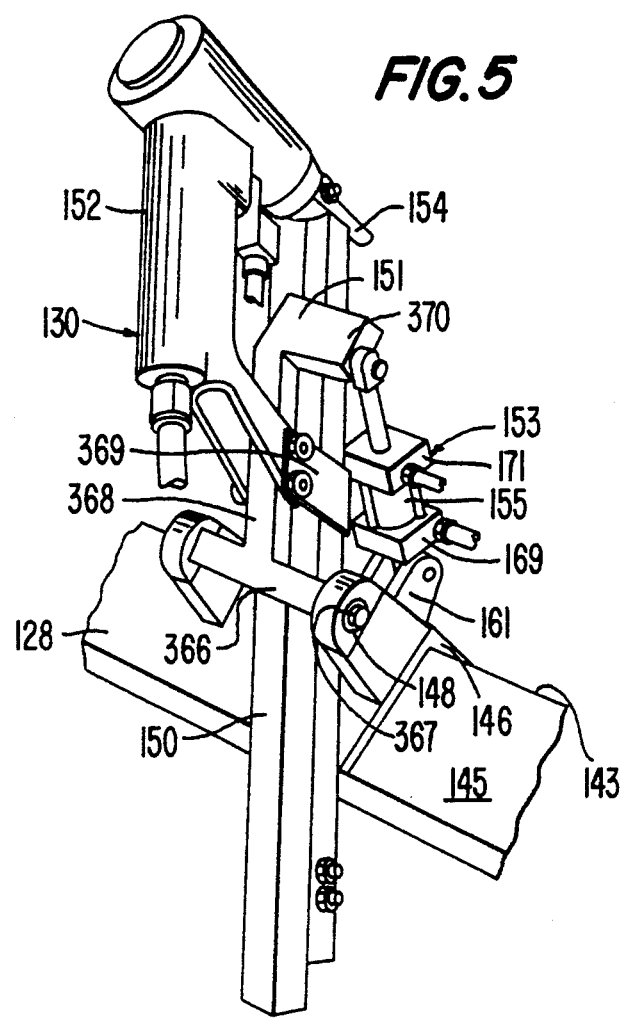
FIG. 5 is a perspective view of an embodiment of the stapling unit assemblies of the fixed and movable banks of stapling unit assemblies of the embodiment of this invention illustrated in FIG. 1.

Likewise, plungers of 157 of air cylinder assemblies 153 of 1) stapling unit assemblies 130 of fixed bank 24, 2) combined stapling and clamping units 149 of fixed bank 24, 3) stapling unit assembly 196 of movable bank 26, and 4) combined stapling and clamping units 213 of movable bank 26 are in their respective extended positions, thus holding all of the staplers 152 of said units in their uppermost position (see FIGS. 5 and 12). Plungers 168 of air cylinder assemblies 164 of 1) clamping assemblies 132 of fixed bank 24, 2) combined stapling and clamping units 149 of fixed bank 24, 3) clamping assemblies 198 of movable bank 26 and 4) combined stapling and clamping units 213 of movable bank 26 are in their retracted positions, thus retaining all of the L-shaped brackets 158 and channel brackets 160 in their uppermost positions (see FIGS. 9 and 12).

In addition, plungers 180 of 1) upper air cylinder assembly 138 and lower air cylinder assembly 140 of fixed bank 24 and 2) upper air cylinder assembly 202 and lower air cylinder assembly 204 of movable bank 26 are in their retracted positions so that plungers 180 will not engage the door frame assembly when door frame assembly 21 is initially received and positioned within casing attachment machine 20 (see dashed lines in FIG. 13). Plunger 430 of air cylinder lock assembly 225 of slidable frame assembly 182 is in the retracted position such that plunger 430 is disengaged from spacer bar 11 and slidable frame assembly 182 is free to slide relative bottom support frame assembly 22 (see FIG. 3). Plungers 538 of air cylinder assemblies 177 and 179 of fixed bank 24 are in their retracted positions such that the interior surfaces of stops 540 are flush with the interior surface of jamb locator 134 (see air cylinder assembly 177 as illustrated by FIG. 35).

Moreover, with respect to head bank 28, plungers 327 of air cylinder assemblies 319 of clamping assemblies 242 and 244 are in their respective retracted positions, so that the respective L-shaped brackets 314 and channel brackets 312 are in their uppermost position (see FIGS. 17-21). Plungers 462 of air cylinder assemblies 452 of stationary stapling unit assemblies 233 and 235 are in their extended position to retain staplers 446 in their respective uppermost position. Plunger 298 of air cylinder assembly 289 of movable stapling unit assembly 238 is in its extended position, holding stapler 284 in its uppermost position (see FIG. 18). Plungers 325 of ejection air cylinder assemblies 243 and 245 are in their respective retracted positions, so that plungers 325 do not interfere when door frame assembly 21 is received in casing attachment machine 20 (see FIGS. 18 and 19). The plunger of air cylinder assembly 291 of movable stapling unit assembly 238 and plunger 444 of air cylinder assembly 434 of clamping assembly 244 are in their respective retracted positions such that movable stapling unit assembly 238 and clamping assembly 244 can be slid along pivot bar 236 (see FIGS. 18 and 21). Plunger 476 of air cylinder assembly 468 of trim guide assembly 247 is in its extended position, extending through and below pole 466 (see FIG. 17). With respect to head bank 28, plunger 248 of linear staple unit drive assembly 240 is in its retracted position such that movable stapling unit assembly 238 is in its position closest to clamping assembly 242 (see FIGS. 18 and 36A).

With respect to corner splicing assemblies 30 and 32, plungers 281 of air cylinder assemblies 264 are in their retracted positions, holding head assemblies 251 in their retracted positions (see FIG. 27). Plungers 261 of air cylinder assemblies 260 are in their retracted positions, holding drivers 258 in their retracted position (see FIGS. 25-27). Last, with respect to corner splicing assemblies 30 and 32, plungers 500 of air cylinder assemblies 328 of clamping assemblies 267 are in their retracted positions, holding clamping assemblies 267 in their uppermost positions (see FIG. 30).

All of the plungers of air cylinder assemblies 347 are in their respective retracted positions such that the top surfaces of support squares 345 are flush with the top surface of cross beams 344 and 346 (see FIG. 32).

Finally, plungers 326 of air cylinder assemblies 316 of clamping assemblies 242 and 244 of head bank 28, and plungers 406 and 414 of air cylinder assemblies 380 and 382, respectively, of 1) clamping assemblies 132 and combined clamping and stapling assemblies 149 of fixed bank 24 and 2) clamping assemblies 198 and combined clamping and stapling assemblies 213 of movable bank 26 are in their retracted positions so that casing can be placed in channel brackets 312 of clamping assemblies 242 and 244 of head bank 28 and channel brackets 160 of 1) clamping assemblies 132 and combined stapling and clamping units 149 of fixed bank 24 and 2) clamping assemblies 198 and combined stapling and clamping units 213 of movable bank 26 (see FIGS. 9, 12 and 17-19).

After door frame assembly 21 passes over rollers 518, door frame assembly 21 engages conveyor 36 which is operated to transport door frame assembly 21 within support frame assembly 22, and centered over cross beam assemblies 344 and 346 (see FIG. 36B).

When door frame assembly 21 is received within support frame assembly 22 of casing attaching machine 20, and positioned over cross beam assemblies 344 and 346, the operator of casing attachment machine 20, positioned at operator's station 534, informs programmable logic controller 38 of the size door frame assembly which is in casing attachment machine 20 by pushing the appropriate buttons.

Next, the operator places splines 29 in front of drivers 258, in the channels formed between spline guides 254 and 256 of corner splicing assemblies 30 and 32 (see FIG. 26). Splines 29 lay flat in the channels.

The operator then places right side casing 25 in the channel brackets 160 of clamping assemblies 132 and combined stapling and clamping units 149 of fixed bank 24 and left side casing 27 in channel brackets 160 of clamping assemblies 198 and stapling and clamping units 213 of movable bank 26 (see FIG. 36B). Casing 25 and 27 is received from glue applying station 530 via a chute 532 with glue applied to the under side of its leading edge. Casing 25 and 27 is placed flat with its lower surface against the bottom of protective material 162 and its back edge against the side of protective material 162 in the channel brackets 160 (see FIGS. 9 and 12). Longitudinally, the lower ends of casing 25 and 27 are positioned against trim guide poles 141 and 215.

Figure 36C:
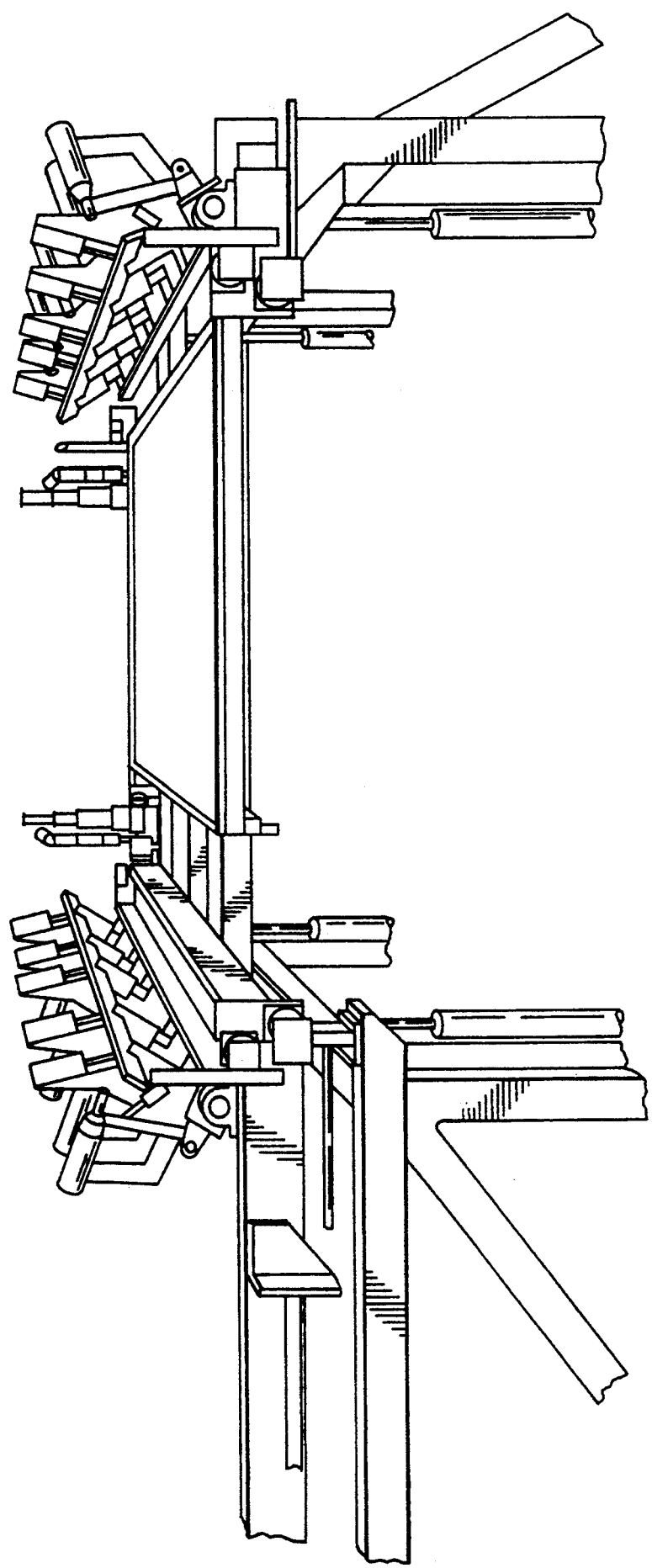

Air cylinders 404 and 412 of air cylinder assemblies 380 and 382, respectively, of 1) clamping assemblies 132 and combined stapling and clamping units 149 of fixed bank 24 and 2) clamping assemblies 198 and combined stapling and clamping assemblies 213 of movable bank 26 are activated and extend plungers 406 and 414 into engagement with side casing 25 and 27 (see FIGS. 9 and 36C). Plungers 406 and 414 retain side casing 25 and 27 in abutment with protective material 162.

Next, air cylinders 189 and 197 of air cylinder assemblies 183 and 185 are activated to retract plungers 191 and 199, respectively, thus retracting movable bank 26 to its outermost position (see FIG. 36C).

Air cylinders 350 of air cylinder assemblies 336, 338, 340 and 342 are then activated and push plungers 352 of the air cylinder assemblies upward. Plungers 352 push cross beam assemblies 344 and 346 upward until they engage the bottom of door frame assembly 21. Further elevation of the plungers 352 causes cross beam assemblies 344 and 346 to lift door frame assembly 21 off of conveyor belt assembly 36 and into a position adjacent and of the same elevation as Jamb locators 134 and 194 of fixed bank of stapling units and movable bank of stapling units 26, respectively (see FIG. 36C). One longitudinal edge of door frame assembly 21 is adjacent jamb locator 134. Air cylinder assemblies 336, 338, 340 and 342 maintain cross beam assemblies 344 and 346, and thus door frame assembly 21, at this elevation while casing is attached to one side of the door frame assembly 21.

Next, air cylinders 189 and 197 of air cylinder assemblies 183 and 185, respectively, are activated, and extend plungers 191 and 199, respectively, inwardly. This movement pushes slidable frame assembly 182 inward until jamb locator 134 is in abutment with one longitudinal edge of door frame assembly 21 and jamb locator 194 is in abutment with the other longitudinal edge of door frame assembly 21 (see FIG. 36D). Air cylinder 428 of air cylinder assembly 225 is activated, and causes plunger 430 to extend and engage adjacent teeth 121 of spacer bar 111 (see FIG. 16). This locks slidable frame 182 relative bottom support frame assembly 22.

Air cylinder 442 of air cylinder assembly 434 of clamping assembly 244 is activated, driving plunger 444 firmly against slide block 436, which in turn drives slide block 436 firmly against pivot bar 236 (see FIG. 21). This locks clamping assembly 244 relative pivot bar 236.

Figure 36D:
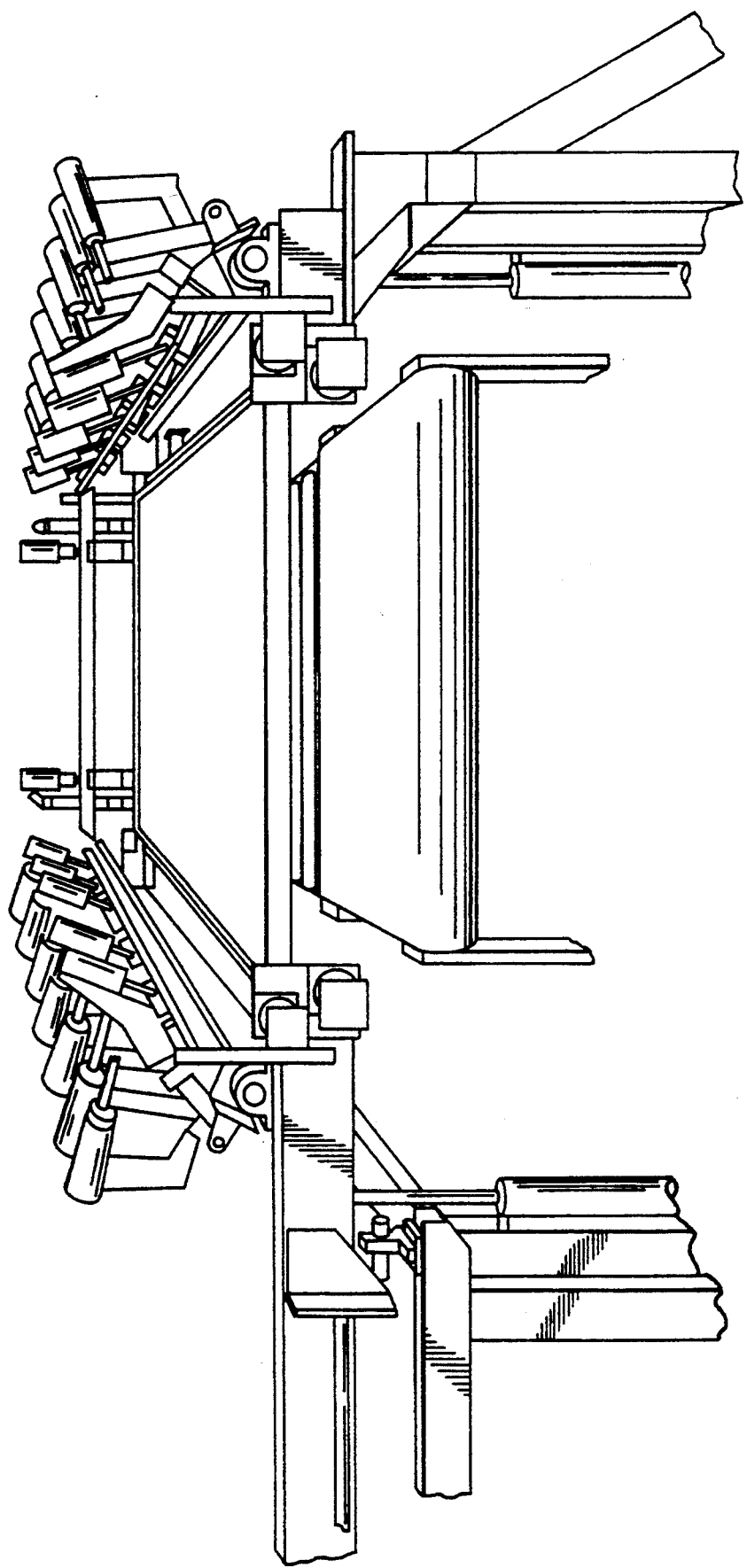

Next, head casing 23 is inserted into channel brackets 312 of clamping assemblies 242 (see FIGS. 19 and 36D). Head casing 23 is received from glue applying station 530 via chute 532. Head casing 23 has glue applied on the under side of its leading edge. Head casing 23 is placed with its bottom surface against the top surface of protective material 318 and the back edge against the back wall of protective material 318. The right edge of head casing 23 is placed in abutment with plunger 476 of air cylinder assembly 468 of trim guide assembly 247, which is in its extended position, extending through and below pole 466 (see FIG. 17). Air cylinders 324 of air cylinder assemblies 316 of clamping assemblies 242 and 244 are activated and extend plungers 326 down into engagement with head casing 23, retaining head casing 23 in channel brackets 312 (see FIG. 19).

Air cylinders 179 of lower air cylinder assembly 140 of fixed bank 24 and of lower air cylinder assembly 204 of movable bank 26 are activated and drive the respective plungers 180 against the ends of the side jambs of door frame assembly 21 (see FIG. 13). This movement moves door frame assembly 21 against the plungers 325 of air cylinder assemblies 243 and 245 of head bank 28 so that door frame assembly 21 is properly aligned longitudinally relative casing attachment machine 20 (see FIG. 17).

Air cylinder 133 of air cylinder assembly 129 of fixed bank 24, air cylinder 205 of air cylinder assembly 181 of movable bank 26 and air cylinder 480 of air cylinder assembly 249 of head bank 28 are activated, extending plungers 135, 207 and 482, respectively. Since the free ends of extendable rods 135, 207 and 482 are rotatably attached to gusset plates 137, 209 and 484, which are in turn fixedly attached to pivot bars 128, 188 and 236, the extension of extendable rods 135, 207 and 482 causes pivot bars 128, 188 and 236 to rotate inwardly, respectively (see FIGS. 4, 15 and 24).

Figure 36E:
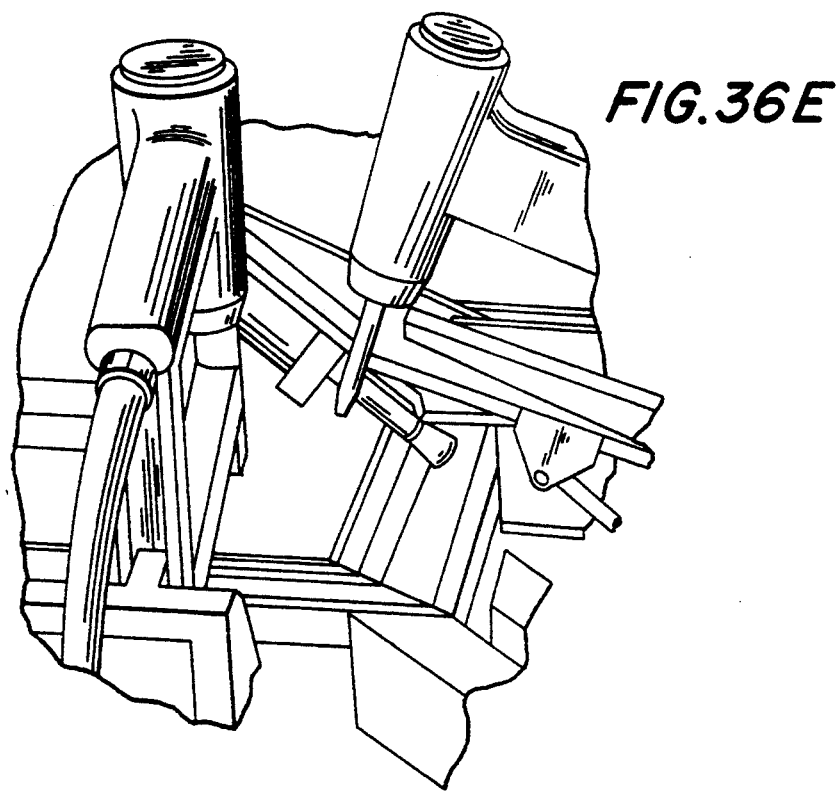

This rotation causes 1) stapling units 130, clamping assemblies 132 and combined stapling and clamping units 149 of fixed bank 24, 2) stapling units 196, clamping assemblies 198 and combined stapling and clamping units 213 of movable bank 26 and 3) clamping assemblies 242 and 244 and movable stapling unit assembly 238 of head bank 28 to be rotated from their respective raised positions to their respective lowered positions (see FIG. 36E). In these lowered positions, since casing 23, 25 and 27 is positioned in the channel brackets 160 of clamping assemblies 132 and 198 and combined stapling and clamping units 149 and 213 and the channel brackets 312 of clamping assemblies 242 and 244, casing 23, 25 and 27 is positioned in abutment with the jambs of door frame assembly 21 (see, for example, FIG. 22). Note that staplers 152 are still above the respective casing 23, 25 and 27.

With regard to clamping assembly 242, the rotation of pivot bar 236 pushes arm 308 inward since arm 308 is rotatably attached on one end to pivot bar 236 by gusset plate 306 (see FIGS. 18 and 23). The other end of arm 308 is rotatably attached to bracket 310. The axis of rotation of arm 308 relative bracket 310 is spaced from the axis of rotation of bracket 310. Bracket 310 is attached to and thus rotatable with secondary pivot bar 276. Thus, movement of arm 308 causes rotation of bracket 310 about secondary pivot bar 276. The rotation of bracket 310 rotates channel bracket 312, L-shaped bracket 314 and air cylinder assembly 316 to their respective down positions.

With respect to clamping assembly 244, collar 432 is attached to pivot bar 236, and thus rotates with pivot bar 236. Arm 438 and 440 are connected, end-to-end, between collar 432 and bracket 310 of clamping assembly 244. Rotation of collar 432 causes movement of arms 438 and 440 inward, thus rotating bracket 310 and secondary pivot bar 276, as discussed above with respect to clamping assembly 242 (see FIG. 21).

Air cylinders 178 of upper air cylinder assembly 138 of fixed bank 24 and of upper air cylinder assembly 202 of movable bank 26 are activated to extend the respective plungers 180 inwardly to properly locate casing 25 and 27, longitudinally, relative door frame assembly 21 (see FIG. 13).

Air cylinders 279 of air cylinder assemblies 264 of corner splicing assemblies 30 and 32 are activated, extending plungers 281 downward (see FIG. 27). This movement of plungers 281 downward causes links 488 and 490 to slide head assemblies 251 forward to the innermost position of head assemblies 251. The top ends of casing 25 and 27 and both ends of casing 23 are received on casing support plates 252, against surfaces 263 and 265 of spline guides 254 and 256 of corner splicing assemblies 30 and 32 (see FIG. 26).

Next, air cylinders 166 of air cylinder assemblies 164 of clamping assemblies 132 and combined stapling and clamping units 149 of fixed bank 24 and of clamping assemblies 198 and combined stapling and clamping units 213 of movable bank 26 are activated, extending plungers 168. Likewise, air cylinders 321 of air cylinder assemblies 319 of clamping assemblies 242 and 244 of head bank 28 are activated, pushing plungers 327 outward. This further secures casing 23, 25 and 27 against the appropriate jambs since plungers 168 and 327 are connected to L-shaped brackets 158 and 314, respectively, and thus apply rotational force on channel brackets 160 and 312, pressing casing 23, 25 and 27 against the jambs of door frame assembly 21 (see FIGS. 9, 17–19 and 21). This movement results in a cam action which forces any excess glue out the back edge of casing 23, 25 and 27.

In addition, to further secure casing 23, 25 and 27 in abutment with door frame assembly 21 and to secure the mitered edges of casing 23, 25 and 27 in abutment, air cylinders 494 of air cylinder assemblies 328 of corner splicing assemblies 30 and 32 are activated, rotating clamp assembly 330 to the down position such that rubber tips 334 engage the corners of the respective casing pieces, one rubber tip 334 being positioned on each side of the miter between the respective pieces (see FIGS. 29 and 30). This is accomplished since air cylinders 494 push plungers 500 outward. This causes the rotation of links 506, brackets 510 and arms 512 about brackets 504, as discussed above.

Figure 36F:
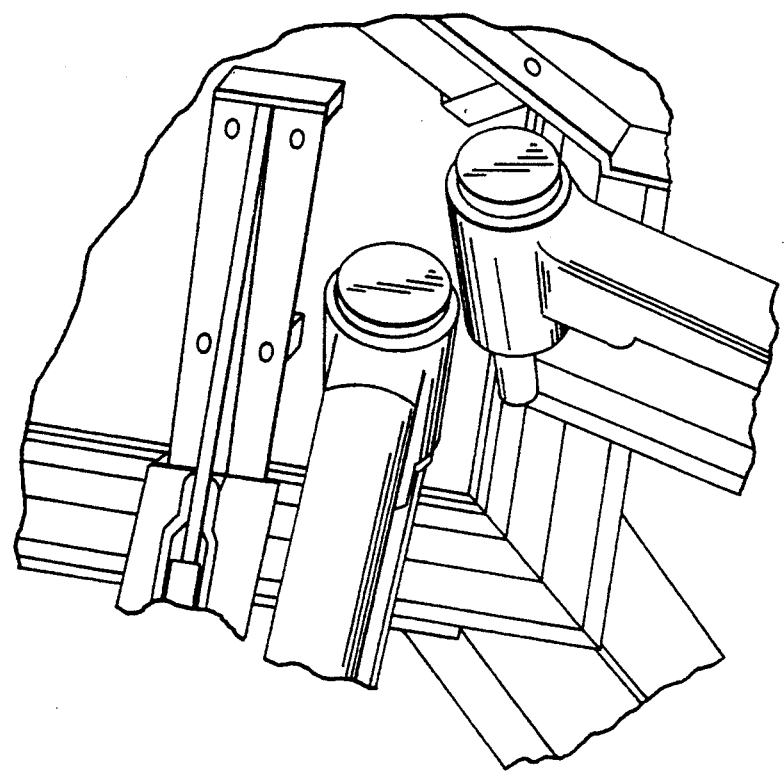

Air cylinders 180 of top air cylinder assemblies 170 and 204 of fixed bank 24 and movable bank 26 are activated, withdrawing the respective plungers 178 out of contact with the casing (see FIG. 13). Next, air cylinders 155 of 1) air cylinder assemblies 153 of stapling unit assemblies 130 and combined stapling and clamping units 149 of fixed bank 24 and 2) stapling unit assemblies 196 and combined stapling and clamping units 213 of are activated, withdrawing the respective plungers 157 (see FIG. 5). Since plungers 157 are rotatably attached to staplers 152, this causes rotation of staplers 152 to the position wherein anvils 154 are in abutment with the appropriate casing pieces (see FIG. 36F). Likewise, air cylinders 460 of air cylinder assemblies 452 of stationary stapling units 233 of head bank 28 are activated, withdrawing plungers 462 and rotating staplers 446 such that anvils 285 are in contact with head casing 27 (see FIG. 22).

Staplers 152 of 1) stapling unit assemblies 130 and combined stapling and clamping units 149 of fixed bank 24, and 2) stapling unit assemblies 196 and combined stapling and clamping units 213 of movable bank 26 and staplers 446 of stationary stapling assemblies 233 and 235 of head bank 28 are simultaneously activated, driving staples through casing 23, 25 and 27 into the jambs of door frame assembly 21 to secure casing 23, 25 and 27 to the door frame assembly 21.

Next, linear staple unit drive assembly 240 and movable stapling unit assembly 238 are activated and function co-jointly. These units work such that linear drive motor 246 is activated to extend plunger 248 with periodic stops at selected spaced intervals (see FIG. 34). Since movable stapling unit assembly 238 is attached to plunger 248, it likewise moves and stops periodically at the selected spaced intervals. Whenever stapling unit assembly 238 stops, it is activated to drive a staple into casing 23 and door frame assembly 21.

Specifically, when movable stapling unit assembly 238 stops, air cylinder 293 of air cylinder assembly 291 is activated, driving the plunger thereof into firm engagement with slide blocks 298, which in turn firmly engages pivot bar 236 (see FIG. 18). This "locks" movable stapling unit assembly 238 relative pivot bar 236. Air cylinder 296 of air cylinder assembly 289 is operated to retract plunger 298, pulling stapler 284 down such that anvil 285 abuts head casing 23. Stapler 284 is activated, driving a staple through head casing 23 into the underlying jamb. Air cylinder assembly 289 is activated, pushing plunger 298 upward against stop 286 and rotating stapler 284 away from head casing 23. Air cylinder 293 is activated to retract its plunger. This permits movable stapling unit assembly 238 to slide along pivot bar 238. The motor of linear staple unit drive assembly 240 is activated, extending plunger 248. Plunger 248 stops at a pre-programmed distance.

At this point, the above sequence regarding air cylinder assemblies 291 and 289 and stapler 284 is repeated, driving another staple into head casing 23 and the appropriate jamb. When movable stapling unit assembly 238 has traversed the width of door frame assembly 21, plunger 248 is completely retracted, returning movable stapling unit assembly 238 to its starting position.

In this manner, staples are driven along head casing 23 and at predetermined intervals, regardless of the width of the door frame assembly being worked upon. This feature enables casing attachment machine 20 to accept and attach casing to door frame assemblies of various widths.

Next, air cylinders 155 of air cylinder assemblies 153 of stapling unit assemblies 130 and combined stapling and clamping units 149 of fixed bank 24 and of stapling unit assemblies 196 and combined stapling and clamping units 213 of movable bank 26 are activated, extending plungers 157, and thus pushing top arms 370 of Z-bars 151 upward (see FIG. 5). This rotates staplers 152 upward away from the casing. Likewise, air cylinders 460 of air cylinder assemblies 452 of stationary stapling units 233 and 235 are activated, retracting plungers 462 and rotating staplers 446 upward away from the casing (see FIG. 22).

Next, air cylinders 273 of air cylinder assemblies 260 of corner splicing assemblies 30 and 32 are activated, driving plungers 261 outward (see FIG. 27). Since plungers 261 are connected to drivers 258 and splines 29 have been inserted into the channels between spline guides 254 and 256, in front of drivers 258, splines 29 are driven into the casing corners by plungers 261 and drivers 258. Air cylinders 273 are then activated to retract plungers 261 and drivers 258. Air cylinders 494 of air cylinder assemblies 328 of clamping assemblies 267 are then activated to unclamp the casing corners (see FIGS. 29 and 30). Specifically, plungers 500 of air cylinder assemblies 328 are retracted, causing the rotation of links 506, brackets 510 and arms 512 about brackets 504, as discussed above.

Air cylinders 178 of lower air cylinder assemblies 140 and 204 of fixed bank 24 and head bank 26, respectively, are activated to retract the respective plungers 180 out of engagement with door frame assembly 21 (see FIG. 13).

Air cylinders 166 of air cylinder assemblies 164 of clamping assemblies 132 and combined stapling and clamping units 149 of fixed bank 24 and of clamping assemblies 198 and combined clamping and stapling units 213 of movable bank 26 are activated, retracting plungers 168 (see FIG. 9). Air cylinders 321 of air cylinder assemblies 319 of clamping assemblies 242 and 244 of head bank 28 are operated to retract plungers 327 (see FIGS. 17-19). This releases some of the pressure on casing 23, 25 and 27.

Air cylinders 279 of air cylinder assemblies 264 of corner splicing assemblies 30 and 32 are operated to retract plungers 281. This causes head assembly 251 to slide outwardly to its starting position (see FIG. 27).

Air cylinders 404 of air cylinder assemblies 380 and air cylinders 412 of air cylinder assemblies 382, both of 1) clamping assemblies 132 and combined stapling and clamping units 149 of fixed bank 24 and 2) clamping assemblies 198 and combined stapling and clamping assemblies 213 of movable bank 26 are activated to withdraw plungers 406 and 414 out of contact with casing 25 and 27 (see FIG. 9). Likewise, air cylinders 324 of air cylinder assemblies 316 of clamping assemblies 242 and 244 are activated to withdraw plungers 326 out of contact with head casing 23 (see FIG. 19).

Air cylinders 189 and 197 of air cylinder assemblies 183 and 185 are activated, retracting plungers 191 and 199, respectively, and thus retracting movable bank 26 to its outermost position.

Air cylinders 323 of ejection air cylinder assemblies 243 and 245 of head bank 28 are activated to extend and retract plungers 325 (see FIG. 18). The extension of plungers 325 pushes the entire door frame assembly 21 away from head bank 28.

Air cylinder 442 of air cylinder assembly 434 of head bank 28 is activated to retract plunger 444, such that side blocks 436, and thus the entire clamping assembly 244, are free to slide relative pivot bar 236 (see FIG. 21). Air cylinder 428 of air cylinder lock assembly 225 is activated to retract plunger 430 out of engagement with teeth 121 of spacer bar 111 (see FIG. 16). This frees slidable frame assembly 182 so that it can slide relative bottom support frame assembly 22.

Air cylinders 536 of air cylinder assemblies 177 and 179 of fixed bank 24 are activated, extending plungers 538 and stops 540 inwardly (see FIG. 35). This movement pushes the door frame assembly away from jamb locator 134 at least a distance such that casing 25 is out of channel brackets 160 of clamping assemblies 132 and combined stapling and clamping units 149. Plungers 538 are then retracted to their start positions.

Air cylinders 350 of air cylinder assemblies 336, 338, 340 and 342 are activated to lower plungers 352, and thus cross beam assemblies 344 and 346 and the entire door frame assembly. This movement is continued until cross beam assemblies 340 and 342 are beneath the top surface of the conveyor belt of conveyor belt assembly 36 such that the door frame assembly is replaced on conveyor belt assembly 36.

Air cylinders 133, 205 and 480 of air cylinder assemblies 129, 181 and 249 are activated to retract plungers 135, 207 and 482, and thus rotate pivot bars 128, 188 and 236, respectively, back to their starting position (see FIGS. 4, 15 and 24). This rotates all of the stapling units 130, 196, 233, 235 and 238, clamping assemblies 132, 198, 242 and 244 and combined stapling and clamping units 149 and 213 upwardly.

Air cylinders 189 and 197 are activated to extend plungers 191 and 199, respectively. This moves movable bank 26 back towards fixed bank 24 until movable bank 26 reaches its starting position.

Conveyor belt assembly 36 is then activated and transmits door frame assembly 21, now having casing attached on one side, to conveyor 520 (see FIG. 33). Conveyor 520 transports door frame assembly 21 to door turning station 522. After door frame assembly 21 is rotated 180 degrees at door turning station 522, either by hand or automatically, door frame assembly 21 is transported by conveyor 524 to the second casing attaching machine 20, wherein the above steps are repeated to attach casing to the second side of door frame assembly 21, with one exception.

The sole exception is that when the door frame assembly is received on cross beam assemblies 344 and 346, the appropriate air cylinder assemblies 347 are activated to raise the appropriate support squares 345 such that the jambs are supported by the appropriate support squares 345 (see FIG. 32). The support squares 345 which are raised are dependent on the width of the door frame assembly being worked on.

After casing is attached to the second side of door frame assembly 21 by the second casing attachment machine 20, conveyor 526 transports the completed door frame assembly to output station 528.

Programmable logic controller 38 is programmed to automatically sequence the various elements of the assembly line and casing attachment machines 20 as discussed above. All of the air cylinder valves and manifolds are regulated by programmable logic controller 38 to release air to the various air cylinders to perform the steps stated above.

In addition, the various stapling units of casing attachment machine 20 can be oriented at various angles with respect to casing received in casing attachment machine 20. In this manner, the staples can be driven in with the grain, across the grain or at any desired angle with the grain.

Other improvements, embodiments and modifications to this invention will become apparent to those skilled in the art once given this disclosure. Such other embodiments, improvements and modifications are considered to be within the scope of the claims as set forth below.

I claim:

1. A stapling assembly for attachment to a machine comprising:
    a support bar having top and bottom portions and a middle portion extending between said top and bottom portions, a stapler and an air cylinder assembly;
    said bottom portion having a first portion at an angle to said middle portion and being designed to be rotatably attached to the machine such that said support bar and said stapler are rotatable about a longitudinal axis of said first portion;
    said stapler being attached to said middle portions;
    said air cylinder assembly extending between and connected near its respective ends to said machine and said top portion to cause the support bar and the stapler to rotate about the first portion when operated.

2. A stapling assembly for attachment to a machine according to claim 1, wherein
    said top and bottom portions are arms which are substantially in parallel.

3. A stapling assembly for attachment to a machine according to claim 2, wherein
    said middle portion extends diagonally between said top and bottom arms.

4. A stapling assembly comprising:
    a base, a bar having spaced top and bottom arms and a middle portion extending between said arms, a stapler and an air cylinder assembly;
    said bottom arm being rotatably attached to said base, said stapler being attached to said middle portion and said air cylinder assembly extending between and being connected near its respective ends to said base and said top arm.

5. A stapling assembly according to claim 4, wherein said top and bottom arms are substantially parallel.

6. A stapling assembly according to claim 5, wherein said middle portion extends diagonally between said top and bottom arms.

7. A stapling assembly comprising:
    a support bar having top and bottom arms and a middle portion extending between said top and bottom arms, a stapler and an air cylinder assembly;
    said stapler being fixedly attached to said middle portion;
    said air cylinder assembly extending between and being connected near its respective ends to a machine and said top arm for rotating the support bar and the stapler about a longitudinal axis of the bottom arm.

8. A stapling assembly according to claim 7 wherein said support bar is a single, integral bar.

9. A stapling assembly according to claim 8 wherein said top and bottom arms are substantially in parallel.

10. A stapling assembly according to claim 9 wherein said support bar is substantially Z-shaped.

11. A stapling assembly according to claim 10 wherein said stapler is rotatable between at least a rest a work position, such that when said stapler is in the work position said stapler is adjacent a work piece and when said stapler is in the rest position said stapler is spaced from the work piece.

12. A stapling assembly according to claim 7 wherein said top and bottom arms are substantially in parallel.

13. A stapling assembly according to claim 12 wherein said support bar is substantially Z-shaped.

14. A stapling assembly according to claim 13 wherein said stapler is rotatable between at least a rest and a work position, such that when said stapler is in the work position said stapler is adjacent a work piece and when said stapler is in the rest position said stapler is spaced from the work piece.

15. A stapling assembly according to claim 7 wherein said stapler is rotatable between at least a rest and a work position, such that when said stapler is in the work position said stapler is adjacent a work piece and when said stapler is in the rest position said stapler is spaced from the work piece.

* * * * *